US008169652B2

(12) United States Patent
Yoda

(10) Patent No.: US 8,169,652 B2
(45) Date of Patent: May 1, 2012

(54) ALBUM CREATING SYSTEM, ALBUM CREATING METHOD AND CREATING PROGRAM WITH IMAGE LAYOUT CHARACTERISTICS

(75) Inventor: Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1018 days.

(21) Appl. No.: 11/540,652

(22) Filed: Oct. 2, 2006

(65) Prior Publication Data

US 2007/0076258 A1    Apr. 5, 2007

(30) Foreign Application Priority Data

Sep. 30, 2005    (JP) .................................. 2005-287177
Jun. 14, 2006    (JP) .................................. 2006-165126

(51) Int. Cl.
*G06K 15/00*    (2006.01)
(52) U.S. Cl. ......................... 358/1.18; 358/1.2; 345/428
(58) Field of Classification Search ................. 358/1.18, 358/1.2; 345/428
See application file for complete search history.

(56) References Cited

U.S. PATENT DOCUMENTS

| 4,949,287 | A | * | 8/1990 | Yamaguchi et al. | .......... 715/246 |
| 5,381,248 | A | * | 1/1995 | Ikeda et al. | .................. 358/538 |
| 7,236,637 | B2 | * | 6/2007 | Sirohey et al. | ................ 382/240 |
| 2003/0147097 | A1 | * | 8/2003 | Kotani et al. | ................ 358/1.18 |
| 2004/0190059 | A1 | * | 9/2004 | Winter et al. | ................ 358/1.15 |
| 2004/0218201 | A1 | * | 11/2004 | Lermant et al. | ............. 358/1.13 |
| 2005/0002063 | A1 | * | 1/2005 | Hanamoto | .................... 358/1.18 |
| 2005/0030563 | A1 | * | 2/2005 | Matsunami et al. | ........... 358/1.9 |
| 2006/0133832 | A1 | * | 6/2006 | Watanabe et al. | ............... 399/27 |

FOREIGN PATENT DOCUMENTS

| JP | 10-200730 A | 7/1998 |
| JP | 2004-48284 A | 2/2004 |
| JP | 2004-318221 A | 11/2004 |

* cited by examiner

*Primary Examiner* — Benny Tieu
*Assistant Examiner* — Qian Yang
(74) *Attorney, Agent, or Firm* — Sughrue Mion, PLLC

(57) ABSTRACT

A layout information generating apparatus is provided, for automatically selecting an original image appropriate to be laid out in a template based on information on an output device. The layout information generating apparatus according to the present invention includes: a low-capacity image receiving section for receiving a low-capacity image obtained by reducing the capacity of an original image from an orderer apparatus; an output characteristic information acquiring section for acquiring output characteristic information indicative of the output characteristic of an output device for outputting an image created by an image creating apparatus; an image selecting section for selecting a low-capacity image to be laid out among the low-capacity images based on the output characteristic information; a layout information generating section for generating layout information of the low-capacity image; and a layout information transmitting section for transmitting the layout information to the output device and causing the output device to lay out an original image provided from an orderer and output the same.

25 Claims, 15 Drawing Sheets

ALBUM CREATING SYSTEM, ALBUM CREATING METHOD AND CREATING PROGRAM WITH IMAGE LAYOUT CHARACTERISTICS

CROSS REFERENCE TO RELATED APPLICATIONS

The present application relates to and claims priority from Japanese Patent Applications Nos. JP 2005-287177 filed in Japan on Sep. 30, 2005 and JP 2006-165126 filed in Japan on Jun. 14, 2006, the contents of which are incorporated herein by reference for all purpose.

BACKGROUND OF THE INVENTION

1. Field of the Invention

The present invention relates to a layout information generating apparatus, a layout information generating method, a layout information generating program, an orderer apparatus, an image creating system, an image creating method and an image creating program. Particularly, the present invention relates to a layout information generating apparatus, a layout information generating method, a layout information generating program, an orderer apparatus, an image creating system, an image creating method and an image creating program for creating an image using images provided from the orderer.

2. Related Art

A method of recording editing information obtained by editing an image read with low-resolution by a user, editing the image read with high resolution based on the record editing information and outputting the same is disclosed, for example, in Japanese Patent Application Publication No. 1998-200730 (1). Additionally, a method of sending an image and order information online by a user to order to create media and sending the preview of the media as an image with a low resolution (thumbnail) is disclosed, for example, in Japanese Patent Application Publication No. 2004-318221 (2). Further, a method of printing an album in which a desired image is laid out by designating the image which is laid out in an image frame of a template selected through a cellular phone is disclosed, for example, in Japanese Patent Application Publication No. 2004-48284 (3).

However, as for the invention of the patent document (1), since a user edits images, sometimes the user who does not have skill to edit images has a little trouble to lay out images to be used to create an album. As for the invention of the patent document (2), firstly all images including a high quality image which can not be used to create an album by user are sent to a server. Therefore, when a number of images are sent to the server, it requires huge amounts of time dependent on transmission speed, and the communications traffic and the cost for communications may be increased. As for the invention of the patent document (3), a user has to input all the identification numbers of images to be printed to his/her cellular phone one by one, so that it requires huge amounts of time and work. Additionally, any of the patent documents (1)-(3), it may be difficult to create an album showing the type and the characteristic of an output device for outputting the album because the album is created without considering the type and the characteristic of the output device.

SUMMARY OF THE INVENTION

Thus, it is an object of the present invention to provide a layout information generating apparatus, a layout information generating method, a layout information generating program, an orderer apparatus, an image creating system, an image creating method and an image creating program which are capable of solving the problem accompanying the conventional art. The above and other objects can be achieved by combining the features recited in independent claims. Then, dependent claims define further effective specific example of the present invention.

In order to solve the above described problems, a first aspect of the present invention provides a layout information generating apparatus for laying out images provided from an orderer. The layout information generating apparatus includes: a low-capacity image receiving section for receiving a low-capacity image obtained by reducing the capacity of an original image by the orderer; an output characteristic information acquiring section for acquiring output characteristic information indicative of the output characteristic of an output device for outputting an image created by an image creating apparatus; an image selecting section for selecting a low-capacity image to be laid out among the low-capacity images received by the low-capacity image receiving section based on the output characteristic information acquired by the output characteristic information acquiring section; a layout information generating section for generating layout information of the low-capacity image selected by the image selecting section; and a layout information transmitting section for transmitting the layout information generated by the layout information generating section to an output device and causing the output device to lay out the original image provided from the orderer and output the same according to the transmitted layout information.

The layout information generating apparatus may further includes an output characteristic information storage section for storing output characteristic information of the output device in association with type of output device information indicative of the type of output device and a type of output device information acquiring section for acquiring from an oarderer apparatus type of output device information of the output device for outputting an image created by the image creating apparatus in association with the low-capacity image received by the low-capacity image receiving section. The output characteristic information acquiring section may acquire the output characteristic information stored in the output characteristic information storage section in association with the type of output device information acquired by the type of output device information acquiring section. The output characteristic information acquiring section may acquire the output characteristic information stored in the output characteristic information storage section in association with the type of output device information acquired by the type of output information acquiring section. Additionally, the output characteristic information acquiring section may receive output characteristic information indicative of the printing characteristic of a printing device for printing the image created by the image creating apparatus. The layout information transmitting section may transmit the layout information generated by the layout information generating section to the printing device and cause the printing device to print the image in which an original image provided from the orderer is laid out according to the transmitted layout information.

The out characteristic information acquiring section may receive output characteristic information indicative of the remaining amount of ink for each color of the printing device for printing the image created by the image creating apparatus. The image selecting section may select a low-capacity image laid out to be laid out among the low-capacity images received by the low-capacity image receiving section in order that the printing device can print with the remaining amount of ink for each color indicated by the output characteristic information acquired by the output characteristic information acquiring section. The layout information generating section may generate layout information of the low-capacity image selected by the image selecting section in order that the printing device can print with the remaining amount of ink for each color indicated by the output characteristic information acquired by the output characteristic information acquiring section.

The output characteristic information acquiring section may receive output characteristic information indicative of the size of paper used for the printing device for printing the image created by the image creating apparatus. The image selecting section selects a low-capacity image laid out among the low-capacity images received by the low-capacity image receiving section dependent on the size of paper indicated by the output characteristic information acquired by the output characteristic information acquiring section. The layout information generating section may generate layout information of the low-capacity image selected by the image selecting section dependent on the size of paper indicated by the output characteristic information acquired by the output characteristic information acquiring section. Additionally, the layout information generating section may determine a color of the background of a template in which the low-capacity image selected by the image selecting section is laid out based on the output characteristic information acquired by the output characteristic acquiring section.

The output characteristic information acquiring section may receive output characteristic information indicative of the display characteristic of a display device for displaying the image created by the image creating apparatus. The layout information transmitting section transmits the layout information generated by the layout information generating section to the display device and cause the display device to display the image in which the original image provided from the orderer is laid out according to the transmitted layout information. Then, the output characteristic information acquiring section may receive output characteristic information indicative of the display size of the display device for displaying the image created by the image creating apparatus. The image selecting section may select a low-capacity image to be laid out among the low-capacity images received by the low-capacity image receiving section dependent on the display size indicated by the output characteristic information acquired by the output characteristic information acquiring section. The layout information generating section may generate layout information of the law-capacity image selected by the image selecting section dependent on the display size indicated by the output characteristic information acquired by the output characteristic information acquiring section.

The layout information generating apparatus may further include a type of output device information storage section for storing type of output device information indicative of the type of output device in association with the output characteristic information of the output device, a type of output device information acquiring section for acquiring the type of output device information stored in the type of output device information storage section in association with the output characteristic information acquired by the output characteristic information acquiring section, and a type of output device transmitting section for transmitting the type of output device indicated by the type of output device information acquired by the type of output device information acquiring section and causing the orderer apparatus to present the type of output device to the orderer. The type of output device information storage section may further store output device location information indicative of a location at which the output device is installed in association with the type of output device information. The type of output device transmitting section may transmit the location of the output device of which type is indicated by the type of output device information acquired by the type of output device information acquiring section to the orderer apparatus and causing the orderer apparatus to present the type of output device to the orderer.

The output characteristic information acquiring section may acquire output characteristic information indicative of the range of the printing region of the image on media by the printing device for printing the image created by the image creating apparatus. The image selecting section may select a low capacity image to be laid out among the low-capacity images received by the low-capacity image receiving section dependent on the printing region indicated by the output characteristic information acquired by the output characteristic information acquiring section. The layout information generating section may generate layout information of the low-capacity image selected by the image selecting section. Then, the output characteristic information acquiring section may acquire output characteristic information indicating whether a printing of the image on the media by the printing device is a frameless printing or a framed printing. When the output characteristic information acquiring section acquires output characteristic information indicative of the framed printing, the image selecting section may select the low-capacity image including the whole of a main subject therein, and may not select the low-capacity image in which the main subject is cut by the circumference of the low-capacity image.

The low-capacity image receiving section receives the low-capacity image and a color included in the original image corresponding to the low-capacity image from the orderer apparatus. The output characteristic information acquiring section acquires output characteristic information indicative of a color to be outputted by the output device. The image selecting section may compare the color included in the original color received by the low-power image receiving section with the color indicated by the output characteristic information acquired by the output characteristic information acquiring section and preferentially select the image including more color which can be outputted by the output device as a low-capacity image to be laid out among the low-capacity images received by the low-capacity image receiving section. Additionally, the layout information generating apparatus may further include an image cropping section for comparing the color included in the original image received by the low-capacity image receiving section with the color indicated by the output characteristic information acquired by the output characteristic information acquiring section and cropping a portion except for the other portion including the color which can not to be outputted by the output device as the low-capacity image to be laid out. The layout information generating section may generate layout information of the low-capacity image cropped by the image cropping section.

A second aspect of the present invention provides a layout information generating method for generating layout information to lay out images provided from an orderer. The layout information generating method includes the steps of: receiving a low-capacity image obtained by reducing the capacity of an original image by the orderer; acquiring output characteristic information indicative of the output characteristic of an output device for outputting an image created by an image creating apparatus; selecting a low-capacity image to be laid out among the low-capacity images received in the low-capacity image receiving step based on the output characteristic information acquired in the output characteristic information acquiring step; generating layout information of the low-capacity image selected in the image selecting step; and transmitting the layout information generated in the layout information generating step to an output device and for causing the output device to lay out an original image provided from the orderer and output the same according to the transmitted layout information.

A third aspect of the present invention provides a layout information generating program for a layout information generating apparatus for laying out images provided from an orderer. The layout information generating program causes the layout information generating apparatus to function as: a low-capacity image receiving section for receiving a low-capacity image obtained by reducing the capacity of an original image by the orderer; an output characteristic information acquiring section for acquiring output characteristic information indicative of the output characteristic of an output device for outputting an image created by an image creating apparatus; an image selecting section for selecting a low-capacity image to be laid out among the low-capacity images received by the low-capacity image receiving section based on the output characteristic information acquired by the output characteristic information acquiring section; a layout information generating section for generating layout information of the low-capacity image selected by the image selecting section; and a layout information transmitting section for transmitting the layout information generated by the layout information generating section to an output device and causing the output device to lay out the original image provided from the orderer and output the same according to the transmitted layout information.

A fourth aspect of the present invention provides a layout information generating apparatus for laying out images provided from an orderer. The layout information generating apparatus includes: an image characteristic information receiving section for receiving image characteristic information indicative of the characteristic of an original image in association with an original image identifier; an original image selecting section for selecting the original image to be laid out based on the image characteristic information received in association with the original image identifier by the image characteristic information receiving section; a layout information generating section for generating layout information by associating the original image identifier to identify the original image selected by the original image selecting section with a layout frame; a layout information transmitting section for transmitting the layout information generated by the layout information generating section to an orderer apparatus and causing the orderer apparatus to create an image in which the original image identified by the original image identifier is laid out.

A fifth aspect of the present invention provides an orderer apparatus for creating images. The orderer apparatus includes: an image characteristic information acquiring section for acquiring image characteristic information indicative of the characteristic of an original image in association with an original image identifier to identify the original image; an image characteristic information transmitting section for transmitting the image characteristic information acquired by the image characteristic information acquiring section to a layout information generating apparatus in association with the original image identifier; a layout information receiving section for receiving layout information generated by associating the original image identifier with a layout frame by the layout information generating apparatus based on the image characteristic information transmitted by the image characteristic information transmitting section; and an image creating section for creating an image in which the original image identified by the original image identifier is laid out according to the layout information received by the layout information receiving section.

A sixth aspect of the present invention provides an image creating system including an orderer apparatus for creating images and a layout information creating apparatus for laying out images provided by an orderer. The orderer apparatus includes: an image characteristic information acquiring section for acquiring the image characteristic information indicative of the characteristic of an original image in association with an original image identifier to identify an original image; an image characteristic information transmitting section for transmitting the image characteristic information acquired by the image characteristic information acquiring section to the layout information generating apparatus in association with the original image identifier; a layout information receiving section for receiving layout information generated by associating the original image identifier with a layout frame by the layout information generating apparatus based on the image characteristic information transmitted by the image characteristic information transmitting section; and an image creating section for creating an image in which the original image identified by the original image identifier according to the layout information received by the layout information receiving section. The layout information generating apparatus includes: an image characteristic information receiving section for receiving the image characteristic information transmitted by the image characteristic information transmitting section in association with the original image identifier; an original image selecting section for selecting an original image to be laid out in the image based on the image characteristic information received in association with the original image identifier by the image characteristic information receiving section; a layout information generating section for generating layout information by associating the original image identifier to identify the original image selected by the original image selecting section with a layout frame; and layout information transmitting section for transmitting the layout information generated by the layout information generating section to the layout information receiving section and causing the image creating section to create the image in which the original image identified by the original image identifier is laid out according to the transmitted layout information.

A seventh aspect of the present invention provides an image creating method. The image creating method includes the steps of: acquiring image characteristic information indicative of the characteristic of an image in association with an original image identifier to identify an original image; transmitting the image characteristic information acquired in the image characteristic information acquiring step in association with the original image identifier; receiving the image characteristic information transmitted in the image characteristic information transmitting step in association with the original image identifier; selecting the original image to be laid out in the image based on the image characteristic information received in association with the original image identifier in the image characteristic information receiving step; generating layout information by associating the original image identifier to identify the original image selected in the original image selecting step with a layout flame; transmitting the layout information generated in the layout information generating step to an orderer apparatus; receiving the layout information transmitted in the layout information transmitting step; and creating an image in which the original image identified by the original image identifier is laid out according to the layout information received in the layout information receiving step.

An eighth aspect of the present invention provides an image creating program for an image creating system including an orderer apparatus for creating images and a layout information creating apparatus for laying out images provided by an orderer. The image creating program causes the image creating system to function as: an image characteristic information acquiring section for acquiring image characteristic information indicative of the characteristic of an original image; an image characteristic information transmitting section for transmitting the image characteristic information acquired by the image characteristic information acquiring section to a layout information generating apparatus in association with the original image identifier; a layout information receiving section for receiving layout information generated by associating the original image identifier with a layout frame by the layout information generating apparatus based on the image characteristic information transmitted by the image characteristic information transmitting section; an image crating section for creating an image in which the original image identified by the original image identifier is laid out according to the layout information received by the layout information receiving section; an image characteristic information receiving section for receiving the image characteristic information transmitted by the image characteristic information transmitting section in association with the original image identifier; an original image selecting section for selecting an original image to be laid out in the image based on the image characteristic information received in association with the original image identifier by the image characteristic information receiving section; a layout information generating section for generating layout information by associating the original image identifier to identify the original image selected by the original image selecting section with a layout frame; and a layout information transmitting section for transmitting the layout information generated by the layout information generating section to the layout information receiving section and causing the image creating section to create an image in which the original image identified by the original image identifier is laid out according to the transmitted layout information.

Here, all necessary features of the present invention are not listed in the summary of the invention. The sub-combinations of the features may become the invention.

According to the present invention, information on the output device received from the orderer apparatus is referred, and a low-capacity image corresponding to an appropriate image to be outputted by the output device is automatically selected among the low-capacity images received from the orderer apparatus. Thereby a sample image in which the selected low-capacity image is laid out can be created, so that the layout of images which is appropriate to be outputted by the output device can be automatically created without selecting by the orderer the image adapted to the characteristic of the output device among a number of images.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
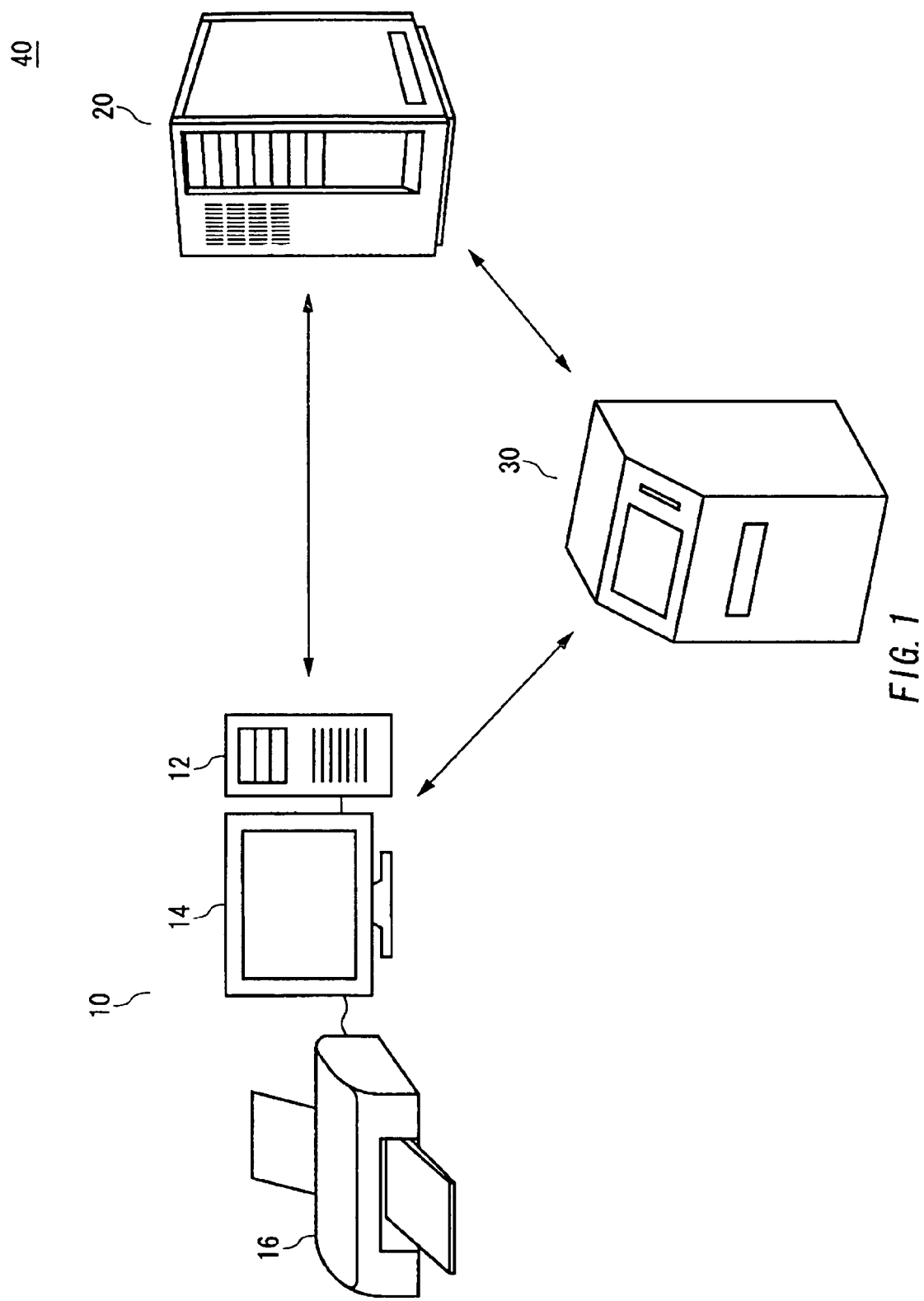
FIG. 1 is a schematic diagram of an image creating system 40.

FIG. 1 is a schematic diagram of an image creating system 40 according to an embodiment of the present invention. The image creating system 40 includes an orderer apparatus 10, a layout information generating apparatus 20 and an image creating apparatus 30. The orserer apparatus 10 includes a main body 12, a display 14 and a printer 16. For example, the orderer apparatus 10 may be a personal home computer. The layout information generating apparatus 20 may be a server connected to the orderer apparatus 10 and the image creating apparatus 30 through a network such as Internet, for laying out images in an album. The image creating apparatus 30 may be a computer provided in a store such as a kiosk where an album is created. Here, images created by the image creating apparatus 30 may be a card, a postcard, a poster and a calendar on which one image is laid out, or a card, a postcard, a poster, a calendar, an image collection, a photo collection and an album on which a plurality of images are laid out.

The object of the image creating system 40 according to the present embodiment is to create automatically images adapted to the type and the characteristic of the printer 16 by automatically selecting a low-capacity image to be laid out in a template from the low-capacity images received from the orderer apparatus 10 and laying out the selected low-capacity image in the template by using information on the type and the characteristic of output device received from the orderer apparatus 10 by the layout information generating apparatus 20.

The orderer apparatus 10 stores images captured and possessed by an orderer therein. The orderer apparatus 10 firstly creates a low-capacity image of the stored image. Here, the low-capacity image may be an image with low resolution, for example. The orderer apparatus 10 provides the low-capacity image corresponding to the stored image to the layout information generating section 20. Additionally, the orderer apparatus 10 may provide to the layout information generating apparatus 20 the color gamut for the image corresponding to the low-capacity image provided to the layout information generating apparatus 20. Further, the orderer apparatus 10 provides to the layout information generating apparatus 20 information on the printer 16, such as the type, the remaining amount of ink, the color gamut to be reproduced by the ink and the type of paper. The layout information generating apparatus 20 selects a low-capacity image corresponding to the image adapted to a template in which the image is laid out when the image is outputted by the printer 16 based on information on the printer 16 received from the orderer apparatus 10.

For example, the layout information generating section 20 selects the low-capacity image corresponding to the original image to be laid out in the template based on the remaining amount of ink for each color of the printer 16. Additionally, the layout information generating apparatus 20 may select the low-capacity image to be laid out in the template, of which lightness and saturation are adapted to the type of template selected by the orderer or the designer. Then, the layout information generating section 20 lays out the selected low-capacity image in the template to create an image sample. The layout information generating section 20 may create a plurality of image samples. Next, the layout information generating apparatus 20 provides the created image sample to the orderer apparatus 10 in association with order identification information to identify the order of the image. Here, layout information in which the low-capacity image is laid out in the template and layout identification information to uniquely identify the layout information may be associated with the order identification information.

The orderer apparatus 10 displays the image samples received from the layout information generating section 20 on the display 14 to cause the orderer to view the same and select a desired image sample. The orderer apparatus 10 extracts the original image corresponding to the low-capacity image included in the image sample selected by the orderer after the orderer selects the desired image sample. Then, the orderer apparatus 10 refers the layout information to create an image in which the original image is laid out. Next, the orderer apparatus 10 outputs the created image from the printer 16. Here, the orderer apparatus 10 may record the created image on a storage medium such as DVD.

Additionally, according to another embodiment, the image creating apparatus 30 creates a low-capacity image obtained by reducing the capacity of an original image received from the orderer. Then, the image creating apparatus 30 provides the low-capacity image to the layout information generating apparatus 20. Additionally, the image creating apparatus 30 also provides information on an output device included in the image creating apparatus 30 to the layout information creating apparatus 20. The layout information creating apparatus 20 selects the low-capacity image adapted to be laid out in the template among the low-capacity images based on the information on the output device received from the image creating apparatus, which is included in the image creating apparatus 30 and lays out the selected low-capacity image in the template to create an image sample. Then, the layout information generating apparatus 20 provides the created image sample to the image creating apparatus 30 in association with order identification information to identify the order of the image.

The image creating apparatus 30 presents the image samples received from the layout information generating apparatus 20 to an orderer, and the orderer selects a desired image sample. Then, when the orderer selects the desired image sample, the image creating apparatus 30 lays out the original image corresponding to the low-capacity image included in the selected image sample in the template to create an image. The image creating apparatus 30 prints the created image on a paper medium. Additionally, the image creating apparatus 30 may record the created image on a recording medium such as a DVD.

In another embodiment, the image creating system 40 provides information on the image creating apparatus 30 to the orderer apparatus 10 and selects an image appropriate to be outputted by the image creating apparatus 30 to create the image based on the information on the image creating apparatus 30 selected by the orderer. Specifically, the layout information generating apparatus 20 provides information on the image creating apparatus 30, such as the type of output device, the type of paper and the location at which the image creating apparatus 30 is installed to the orderer apparatus 10 and causes the orderer to select the image creating apparatus 30 which is desired to create an image by the orderer.

Then, the layout information generating apparatus 20 receives the information on the image creating apparatus 30 selected by the orderer and the low-capacity image from the orderer apparatus 10. Next, the layout information generating apparatus 20 selects a low-capacity image appropriate to lay out in the template from the received low-capacity images and lays out the same. Then, the layout information generating apparatus 20 provides order identification information to the orderer apparatus 10 along with layout identification information associated with the layout information on the low-capacity image. The orderer apparatus 10 stores the layout identification information corresponding to the layout of the image desired to create by the orderer and the original image on a storage medium such as a memory, and then provides the same to the image creating apparatus 30 through the memory.

The image creating apparatus 30 provides the layout identification information received from the orderer apparatus 10 to the layout information creating apparatus 20. The layout information creating apparatus 20 transmits the layout information on the image corresponding to the received layout identification information to the image creating apparatus 30. Next, the image creating apparatus 30 creates an image by using the original image received from the orderer apparatus 10 and the layout information received from the layout information creating apparatus 20. Here, the image creating apparatus 30 may create an image by recording on a storage medium such as a DVD, or may provide the created image online to orderer apparatus 10 as electronic data.

Figure 2:
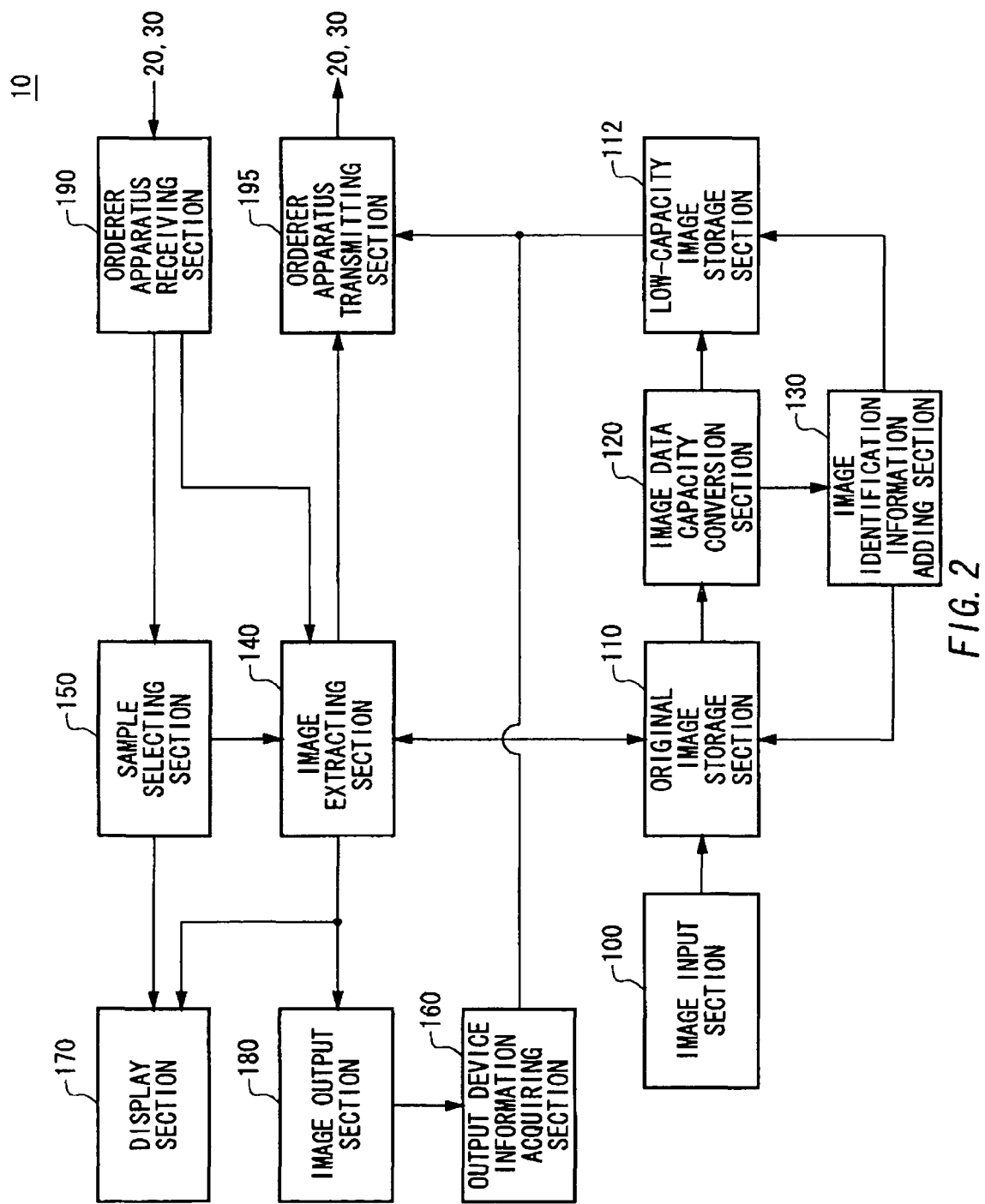
FIG. 2 is a block diagram showing the functional configuration of an orderer apparatus 10.

FIG. 2 shows an example of the functional configuration of an orderer apparatus 10 according to the present embodiment. The orderer apparatus 10 includes an image input section 100, an original image storage section 110, a low-capacity image storage section 112, an image data capacity conversion section 120, an image identification information adding section 130, an image extracting section 140, a sample selecting section 150, an output device information acquiring section 160, a display section 170, an image output section 180, an orderer apparatus receiving section 190 and an orderer apparatus transmitting section 195.

The image input section 100 receives an original image from the outside of the orderer apparatus 10 through a network such as Internet. Additionally, the image output section 100 may receive the original image from such as an image capturing device in which the original image is stored or an image viewer though cable communication or radio communication. Additionally, the image input section 100 may receive image information such as the type of subject included in the original image, the position of a subject on the original image, the time and date at which the original image is captured, the location at which the original image is captured, the type of light source to capture the original image, the image capturing mode at which the original image is captured, the resolution of the original image which can be specified at the image capturing time of the received original image, the frequency component of the original image and the focal distance to capture the original image. The image input section 100 provides the received original image and image information to the original image storage section 110. The original image storage section 110 stores the original image and the image information received from the image input section 100 in association with an identifier to uniquely identify the original image. The original image storage section 110 may directly store the received original image therein without reducing data of the original image. The original image storage section 110 provides the original image to the image data capacity conversion section 120 and the image extracting section 140.

The image data capacity conversion section 120 reduces the amount of data of the original image received from the original image storage section 110 to create a low-capacity image. Here, the low-capacity image may be an image with low-resolution, for example. The image data capacity conversion section 120 may convert the received image to a low-capacity image by irreversibly compressing. When the received image is a still image, the image data capacity conversion section 120 may compress the captured image by means of an image compression method such as JPEG. Additionally, the image data capacity converting section 120 may compress the captured image by means of an image compression method such as MPEG when the received image is a moving image. Further, the image data capacity conversion section 120 may create a low-capacity image by means of reducing the size or the resolution of the original image, and may create an low-capacity image by means of eliminating the high-frequency component of the original image. Additionally, the image data capacity conversion section 120 may increase the compressibility of the image by means of eliminating the number of frequency components or the bit number indicative of the level of the frequency component when the frequency of the image data is converted every regions and stored. The image data capacity converting section 120 provides the created low-capacity image to the low-capacity image storage section 112 and the image identification information adding section 130.

The image identification information adding section 130 adds image identification information to associate the low-capacity image received from the image data capacity converting section 120 with the original image of the low-capacity image to the low capacity image and the original image. The original image corresponding to the low-capacity image can be identified by referring the image identification information. The image identification information adding section 130 provides the image identification information to the original image storage section 110 and the low-capacity image storage section 112. The low capacity image storage section 112 stores the low-capacity image created by the image data capacity conversion section 120 and the image identification information corresponding to the low-capacity image received from the image identification information adding section 130. Here, the original image storage section 110 also stores the image identification information received from the image identification information adding section 130. The low-capacity image storage section 112 provides the low-capacity image to the orderer apparatus transmitting section 195. Additionally, the original image storage section 110 provides the image information corresponding to the low-capacity image provided by the low-capacity image storage section 112 to the orderer apparatus transmitting section 195.

The output device information acquiring section 160 acquires output device characteristic information indicative of the output characteristic of the output device and type of output device information indicative of the type of output device from the image output section 180. The output characteristic information may be the type of ink contained in the output device, the remaining amount of ink for each color, information indicative of the color reproduction region of the output device, the display size, the type of paper (the size of paper, and glazed or matte) and the display characteristic and size of the display. Here, an ICC profile may be used as information indicative of the color reproduction region of the output device. That is to say, the output device information acquiring section 160 may acquire color space information to be outputted by the output device such as a printer and a monitor as output characteristic information. Additionally, the output device information acquiring section 160 acquires a runover width (width for which the image data is not printed) and a non-printed width (margin).

Additionally, the type of output device information may be information to identify the type of output device. Here, the output device may be a printing device such as a printer for printing an image and a display for displaying an image. When the output device is the printing device, the output device information acquiring section 160 may acquire information indicative of the printing region of the image on media by printing device for printing the image. Additionally, the output device information acquiring section 160 may acquire output characteristic information such as the type of paper on which the image desired by the orderer is printed from the outside. The output device information acquiring section 160 provides the acquired output characteristic information and type of output device information to the orderer apparatus transmitting section 195.

The orderer apparatus transmitting section 195 provides the low-capacity image received from the low-capacity image storage section 112, the output characteristic information, the type of output device information and the image information to the layout information generating apparatus 20. Here, the low-capacity image provided to the layout information generating section 20 may be a part of the low-capacity image stored in the low-capacity image storage section 112. Additionally, the orderer apparatus transmitting section 195 provides the original image to the image creating apparatus 30. The orderer apparatus transmitting section 195 provides the low-capacity image, the image identification information and the original image to the layout information generating section 20 or the image creating apparatus 30 through a memory, a network such as Internet, cable communication and radio communication.

The orderer apparatus receiving section 190 receives a plural pieces of order identification information and information on the type of output device from the layout information generating section 20. Here, the order identification information may include the layout information on the image created by the layout information creating apparatus 20, layout identification information to identify the layout information and information on the image samples. The orderer apparatus receiving section 190 provides the received order identification information to the sample selecting section 150 and the image extracting section 140. Specifically, the orderer apparatus receiving section 190 provides the information on the image sample with the order identification information to the sample selecting section 150, and also provides the layout information and the layout identification information with the order identification information to the image extracting section 140.

The sample selecting section 150 causes the orderer to select the desired image sample from the information on the image sample received from the orderer apparatus receiving section 190. For example, the sample selecting section 150 displays the received image sample on the display section 170 and causes the orderer to select the desired image sample. Here, the display 14 is an example of the display section 170. Then, when the orderer selects the desired image sample, the sample selecting section 150 provides the layout identification information associated with the image sample to uniquely identify the image sample and the image identification information added to the low-capacity image included in the image sample to the image extracting section 140.

The image extracting section 140 extracts from the original image storage section 110 the original image corresponding to the low-capacity image included in the layout of the image generated by the layout information generating apparatus 20 based on the layout information and the layout identification information included in the order identification information received from the orderer apparatus receiving section 190. For example, image identification information is added to each of the low capacity image included in the layout information, the image extracting section 140 extracts the image identification information for each of the low-capacity images included in the layout information. Then, the image extracting section 140 extracts the original image corresponding to the extracted image identification information from the original image storage section 110. Additionally, the image extracting section 140 may extract the original image corresponding to the image identification information received from the sample selecting section 150 from the original image storage section 110. The image extracting section 140 provides the extracted original image to the orderer apparatus transmitting section 195. Additionally, the image extracting section 140 provides the extracted original image to the orderer apparatus transmitting section 195. Additionally, the image extracting section 140 provides the layout information and the original image to the display section 170 and causes the display section 170 to display the image. Further, the image extracting section 140 provides the layout information and the original image to the image output section 180.

The image output section 180 outputs the image based on the layout information and the original image received from the image extracting section 140. Specifically, the image output section 180 analyzes the layout information and lays out the original image at a predetermined position in the template to create image data. Then, the image output section 180 outputs the created image data. Here, the printer 16 is an example of the image output section 180. The image output section 180 prints the image on a printing media such as a paper medium. Additionally, the image output section 180 may record the created image on a storage media such as a DVD and output the same.

The orderer apparatus 10 according to the present embodiment can provide the information on the output device included in the orderer apparatus 10 to the layout information generating section 20 and causes the layout information generating section 20 to select an image appropriate for the type and the characteristic of the output device to automatically create the image such that the selected image is laid out in the template. Therefore, the image can be selected and laid out in the template without considering the type and the characteristic of the printer 16 by the orderer.

Figure 3:
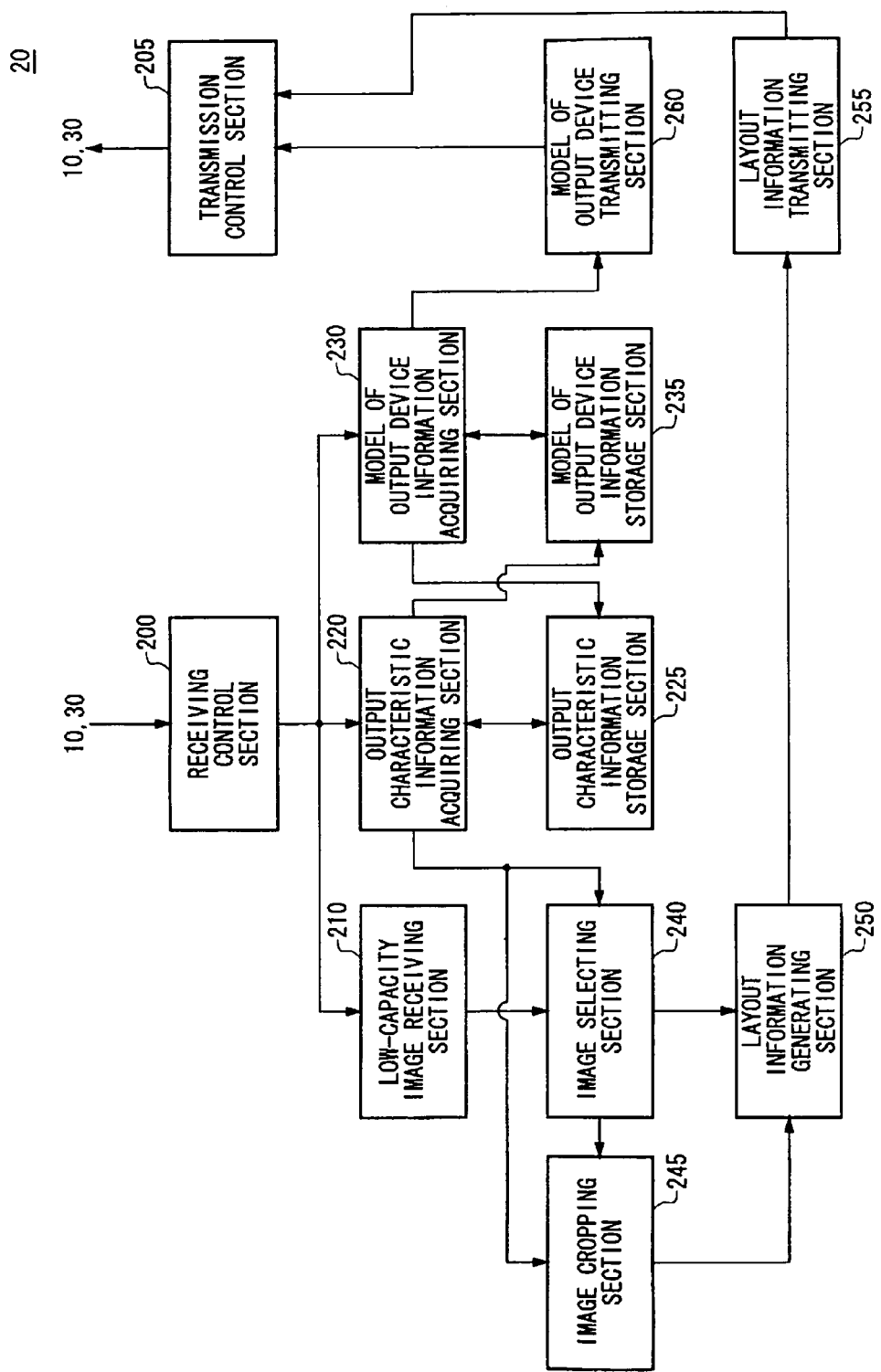
FIG. 3 is a block diagram showing the functional configuration of a layout information generating apparatus 20.

FIG. 3 shows an example of the functional configuration of a layout information generating apparatus 20. The layout information generating apparatus 20 includes a receiving control section 200, a transmission control section 205, a low-capacity image receiving section 210, an output characteristic information acquiring section 220, an output characteristic information storage section 225, a type of output device information acquiring section 230, a type of output information storage section 235, an image selecting section 240, a image cropping section 245, a layout information generating section 250, a layout information transmitting section 255 and a type of output device transmitting section 260. The layout information generating section 20 may further include a template storage section for storing a template including a layout frame into which an image should be laid out.

The receiving control section 200 receives information provided from the orderer apparatus 10 and the image creating apparatus 30 and provides the same to a member having a predetermined function, which is included in the layout information generating apparatus 20. Specifically, the receiving control section 200 provides the low-capacity image received from the orderer apparatus 10 or the image creating apparatus 30 to the low-capacity image receiving section 210. Additionally, the receiving control section 200 provides the output characteristic information received from the orderer apparatus 10 or the image creating apparatus 30 to the output characteristic information acquiring section 220. Further, the receiving control section 200 provides the type of output device information received from the orderer apparatus 10 or the image creating apparatus 30 to the type of output device information acquiring section 230.

The low-capacity image receiving section 210 receives a low-capacity image obtained by reducing the capacity of the original image by the orderer apparatus 10 from the orderer apparatus 10 or the image creating apparatus 30 through the receiving control section 200. Additionally, the low-capacity image receiving section 210 may receive an image of which resolution is reduced by the orderer apparatus 10 from the orderer apparatus 10 or the image creating apparatus 30 through the receiving control section 200. Additionally, the low-capacity image receiving section 210 may receive the low-capacity image and the color contained in the original image corresponding to the low-capacity image from the orderer apparatus 10 or the image creating apparatus 30 through the receiving control section 200. For example, the low-capacity image receiving section 210 may acquire information indicative of the color for each pixel every pixels of the original image. The low-capacity image receiving section 210 provides the colors of the original image corresponding to the received low-capacity image and the original image corresponding to the low-capacity image to the image selecting section 240.

The output characteristic information acquiring section 220 acquires output characteristic information indicative of the output characteristic of the output device for outputting the image created by the image creating system 40. Specifically, the output characteristic information acquiring section 220 acquires the output characteristic information of the output device included in the orderer apparatus 10 or the output characteristic information of the output device included in the image creating apparatus 30 through the receiving control section 200. The output characteristic information may be information indicative of the printing characteristic of the printing device for printing the image created by the image creating system 40 and also may be information indicative of the remaining amount of ink for each color contained in the printing device, information indicative of the color reproduction region of the printing device, such as an ICC profile and information indicative of the size and the type of paper used in the printing device. Specifically, the output characteristic information acquiring section 220 may acquire information indicative of the printing region of the image on the medium by the printing device as the output characteristic information.

Further specifically, the output characteristic information acquiring section 220 may acquire the output characteristic information indicating whether the printing of the image on the media by the printing device is a frameless printing or a framed printing. Additionally, the output characteristic information acquiring section 220 may acquire the output characteristic information indicative of the color to be outputted by the output device. For example, the output characteristic information acquiring section 220 may acquire an ICC profile being the color reproduction information of ink as information indicative of the color to be outputted by the output device. Here, the output characteristic information may be information indicative of the display characteristic of the display device for displaying the image created by the image creating system 40 and also may be information indicative of the display size of the display device. The output characteristic information acquiring section 220 provides the acquired output characteristic information to the image selecting section 240, the image cropping section 245 and the output characteristic information storage section 225.

The image selecting section 240 selects a low-capacity image to be laid out in the template from the low-capacity images received from the low-capacity image receiving section 210 based on the output characteristic information received from the output characteristic information acquiring section 220. Specifically, the image selecting section 240 selects a low-capacity image to be laid out in the template from the low-capacity images received from the low-capacity image receiving section 210 in order to cause the printing device to be able to print by the remaining amount of ink for each color indicated by the output characteristic information received from the output characteristic information acquiring section 220. Thereby when an image is printed by the printing device, the image which can be printed by the remaining amount of ink for each color contained in the printing device can be previously selected, so that it can avoid that the image can not be appropriately printed due to lack of ink.

Here, the image selecting section 240 may acquire a template from the template storage section for storing templates and select a low-capacity image to be laid out in the template. For example, the image characteristic information indicative of the characteristic of the image to be laid out into the layout frame may be associated with the layout frame in the template. The image selecting section 240 may read the image characteristic information associated with the layout frame in the template and select the low-capacity image corresponding to the read image characteristic information. The image characteristic information may be the time and date at which the image is captured, the location at which the image is captured, the type of light source to capture the image, the image capturing mode when the image is captured, the kind of subject in the image and the position of the subject on the image.

Additionally, the image selecting section 240 may select a low-capacity image to be laid out in the template from the low-capacity images received from the low-capacity image receiving section 210 dependent on the size of paper used in the printing device indicated by the output characteristic information received from the output characteristic information acquiring section 210. Thereby when the image is printed by the printing device, the image appropriate for the size of paper used to create the image can be previously selected, so that the orderer does not need to change the size of image in order to fit the image into the size of paper.

Additionally, the image selecting section 240 may select a low-capacity image to be laid out in the template from the low-capacity images received from the low-capacity image receiving section 210 dependent on the display size of the display device, which is indicated by the output characteristic information received from the output characteristic information acquiring section 220. Thereby when the image is displayed on the display device, the image appropriate for the size of image which can be displayed on the display device can be previously selected, so that it can avoid that an image which is partially lacked is displayed when the orderer views the image.

Additionally, the image selecting section 240 may select a low-capacity image to be laid out in the template from the low-capacity images received from the low-capacity image receiving section 210 dependent on the printing region indicated by the output characteristic information received from the output characteristic information acquiring section 220. Specifically, the image selecting section 240 selects a low-capacity image of which main subject is entirely included therein when the output characteristic information acquiring section 220 acquires output characteristic information indicative of a framed printing. Then, the image selecting section 240 does not select the low-capacity image of which main subject is cut by the circumference thereof. Here, when the output characteristic information indicates a frameless printing, the image selecting section 240 may select a template in which the background pattern is laid out, e.g. a template of which entire surface is colored by a predetermined background color provided that the medium including the edge is entirely printed.

For example, when the output characteristic information received from the output characteristic information acquiring section 220 indicates a frameless printing, the image selecting section 240 may select the low-capacity image corresponding to the original image in which the upper part of the subject's body is shown as the low-capacity image to be laid out in the template. Meanwhile, when the output characteristic information received from the output characteristic information acquiring section 220 indicates a framed printing, the image selecting section 240 may select the low-capacity image corresponding to the original image which includes the whole of the main subject therein as the low-capacity image to be laid out in the template. Thereby even if the image is printed with the framed printing, the main subject such as a person is not crossed by the borderline of the print, so that it can avoid that any defect image such that a person is cut off is printed.

Further, the image selecting section 240 may select a template in which characters laid out at predetermined positions are printed at appropriate positions on the media as the template in which the low-capacity image should be laid out based on the runover width and the non-printing width included in the output characteristic information received from the output characteristic information acquiring section 220. For example, the image selecting section 240 would not select a template in which any character laid out in the template is cut off and not printed because of overlapping with the non-printing region when the image is printed. Then, the image selecting section 240 selects a low-capacity image to be laid out in the selected template. Thereby when the image is printed by the orderer apparatus 10, it can avoid that any character laid out in the template is printed with being cut off, and not printed.

Additionally, when the output characteristic information indicates a framed printing, the image selecting section 240 may select a background pattern of the template in which the background of the low-capacity image is faded out from the center to the circumference of the low-capacity image. Further, when the output characteristic information indicates a framed printing, the image selecting section 240 may select a background pattern of the template in which the borderline between the original image corresponding to the low-capacity image and the template is not visible in association with the selected low-capacity image. Specifically, the image selecting section 240 acquires information on colors within a predetermined range from the edge of the original image corresponding to the selected low-capacity image. Then, the image selecting section 240 may select the background pattern to which the background color of which difference from the acquired color is within the predetermined range as a background pattern of the template. For example, when the output characteristic information indicates the framed printing, the background pattern selected by the image selecting section 240 may be a background pattern including a geometric form such as a lattice pattern to which color with lightness or saturation less than that of the colors indicated by the background of the original image corresponding to the low-capacity image is added.

Additionally, the image selecting section 240 compares the color included in the original image received by the low-capacity image receiving section 210 with the color indicated by the output characteristic information acquired by the output characteristic information acquiring section 220. Then, the image selecting section 240 may preferentially select the original image including more color to be outputted by the output device as a low-capacity image laid out in the template from the low-capacity images received by the low-capacity image receiving section 210. For example, the image selecting section 240 compares the color gamut included in the original image with the color reproduction region of ink in the output device, which indicated by the output characteristic information. Here, an ICC profile included in the output characteristic information may be used to present the color reproduction region. Additionally, the image selecting section 240 may calculate the color gamut of the image included in the original image as sRBG. Then, the image selecting section 240 may select the original image in which the colors of the color gamut are little different from those of the color reproduction region. Further, the image selecting section 240 may associate the preference of the selected low-capacity image with each of the plurality of low-capacity images according to the difference between the color gamut of the original image and the color reproduction region of ink. For example, the image selecting section 240 may associate higher preference with the image with low quality corresponding to the original image in which the color gamut of the image is less different from the color reproduction region of ink.

Thereby the difference between the color of the image displayed on the display device 170 of the orderer apparatus 10, which is viewed by the orderer and the color of the image outputted by the image output section 180 can be reduced, so that an image with color tone just desired by the orderer can be outputted. The image selecting section 240 provides the selected low-capacity image to the image cropping section 245 and the layout information generating section 250. Additionally, the image selecting section 240 also provides the color of the original image corresponding to the low-capacity image received by the low-capacity image receiving section 210 to the image cropping section 245.

The image cropping section 245 compares the color included in the original image received by the low-capacity image receiving section 210 with the output characteristic information acquired by the output characteristic information acquiring section 220 and crops a portion except for a portion which can not be outputted by the output device from the low-capacity image selected by the image selecting section 240 as a low-capacity image to be laid out in the template. For example, the image cropping section 245 compares the color included in the original image received by the low-capacity image receiving section 210 with the color indicated by the output characteristic information acquired by the output characteristic information acquiring section 220. Then, the image cropping section 245 may trim an image region in which the color indicated by the output characteristic information is little different from the color included in the original image as a region to be laid out in the template. Thereby output device can eliminate the portion including the color which cannot be reproduced by the output device. For example, when the output characteristic information includes information indicating that the output device can not reproduce marine blue, the image cropping section 245 may refer the color of the original image and crop a portion except for the portion including marine blue as the low-capacity image to be laid out in the template.

Thereby the difference between the color of the image on the display device 170 of the orderer apparatus 170, which is viewed by the orderer and the color of the image outputted by the image output section 180 can be reduced, so that the image with color tone close to that desired by the orderer can be outputted. The image cropping section 245 provides the cropped low-capacity image to the layout information generating section 250.

The layout information generating section 250 receives a low-capacity image selected by the image selecting section 240 based on the output characteristic information acquired by the output characteristic information acquiring section 220 and lays out the low-capacity image to generate layout information on the low-capacity image. For example, when the image intended to create by the orderer is an album, the layout information generating section 250 lays out the low-capacity image to be laid out in the album based on the theme, the taste and the designer of the album desired by the orderer. For example, the layout information generating section 250 selects low-capacity image appropriate for the theme of the album based on the lightness, the saturation and distribution of the spatial frequency of the low-capacity image and lays out the low-capacity image in a page of the album. Additionally, when the layout information generating apparatus 20 receives image information from the orderer apparatus 10, the layout information generating section 250 may select a low-capacity image based on the image information when the layout information generating apparatus 20 receives the image information from the orderer apparatus 10.

Further, the layout information generating section 250 may determine the background color of the template in which the low-capacity image selected by the image selecting section 240 is laid out based on the output characteristic information acquired by the output characteristic information acquiring section 220. Specifically, the layout information generating section 250 may determine the background color of the template based on the remaining amount of ink of the printing device indicated by the output characteristic information. For example, the layout information generating section 250 may determine the background color printed by ink of which remaining amount is more than a predetermined value in order to prevent from printing an inappropriate background pattern due to luck of ink of the printing device when the background pattern is printed. Additionally, receiving the low-capacity image cropped from the low-capacity image by the image cropping section 245, the layout information generating section 250 may generate layout information of the low-capacity image.

The layout information generating section 250 associates the layout information with layout identification information to uniquely identify the layout information. Additionally, the layout information generating section 250 associates the layout information with order identification information to identify an order to create a image. Generating a plural pieces of layout information, the layout information generating section 250 associates the plural pieces of generated layout information and the order identification information including the layout identification information to identify the plural pieces of layout information, respectively with each layout information. Therefore, the layout information generating section 250 can select the predetermined layout information by only selecting the layout identification information. The layout information generating section 250 provides the layout information and the order identification information to the layout information transmitting section 255.

The layout information transmitting section 255 transmits the layout information generated by the layout information generating section 250 to the output device through the transmission control section 205. Specifically, the layout information transmitting section 255 transmits the layout information to the output device included in the orderer apparatus 10 or the output device included in the image creating apparatus 30. Then, the layout information transmitting section 255 causes the output device to output an image in which the original image provided from the orderer apparatus 10 is laid out according to the transmitted layout information. Here, the output device may be a printing device. When the layout information transmitting section 255 transmits the layout information to the printing device, the layout information transmitting section 255 causes the printing device to print an image in which the original image provided from the orderer is laid out according to the transmitted layout information. Meanwhile, when the output device is a display device, the layout information transmitting section 255 transmits the layout information to the display device and causes the display device to display an image in which the original image provided from the orderer is laid out.

The type of output device information acquiring section 230 acquires type of output device information of the output device for outputting the image created by the image creating system 40 from the orderer apparatus 10 through the receiving control section 200 in association with the low-capacity image received by the low-capacity image receiving section 210. Specifically, the orderer apparatus 10 or the image creating apparatus 30 which transmits the low-capacity image to the layout information generating apparatus 20 transmits the type of output device information of the output device to the layout information generating apparatus 20 in association with the low-capacity image. Then, the type of output device information acquiring section 230 included in the layout information generating apparatus 20 acquires the type of output device information through the receiving control section 200.

Next, the type of output device information acquiring section 230 provides the acquired type of output device information to the output characteristic information storage section 225. Here, the output characteristic information storage section 225 may be a storage section for storing the output characteristic information of the output device in association with the type of output device information indicative of the type of output device. Then, the output characteristic information acquiring section 220 acquires the output characteristic information stored in the output characteristic information storage section 225 in association with the type of output device information acquired by the type of output device information acquiring section 230. Specifically, the output characteristic information acquiring section 220 acquires the output characteristic information corresponding to the type of output device information received by the output characteristic information storage section 225 from the type of output device information acquiring section 230, which is stored in the output characteristic information storage section 225.

The type of output device information storage section 235 stores the type of output device information indicative of the type of output device in association with the output characteristic information of the output device. Additionally, the type of output device information storage section 235 may further store output location information indicative of a location at which the output device is installed in association with the type of output device information. Then, the type of output device information acquiring section 230 may acquire the types of output device information stored in the type of output device information storage section 235 in association with the output characteristic information acquired by the output characteristic information acquiring section 220. Specifically, when the output characteristic information acquired by the output characteristic information acquiring section 220 is provided to the type of output device information storage section 235, the type of output device information acquiring section 230 compares the output characteristic information with output characteristic information stored in the type of output device information storage section 235 and acquires type of output device information indicative of the type of output device corresponding to the output characteristic information received from the output characteristic information acquiring section 220. Then, the type of output device information acquiring section 230 provides the type of output device indicated by the acquired type of output device information to the type of output device transmitting section 260.

The type of output device transmitting section 260 transmits the type of output device indicated by the type of output device information acquired by the type of output device acquiring section 230 to the orderer apparatus 10 through the transmission control section 205 and causes the orderer to view the same. Additionally, the type of output device transmitting section 260 may transmit the location of the output device of which type is indicated by the type of output device information acquired by the type of output device information acquiring section 230 to the orderer apparatus 10 through the transmission control device 205.

The layout information generating apparatus 20 according to the present embodiment can automatically select an original image appropriate to be laid out in the template and lay out the same when the image is outputted by the output device according to the type or characteristic of the output device included in the orderer apparatus 10 or the image creating apparatus 30. Accordingly, an original image to be laid out in the template can be automatically selected without considering the type and the characteristic of the output device by the orderer, so that it can avoid that the orderer has to select an image to be laid out in the template.

Figure 4:
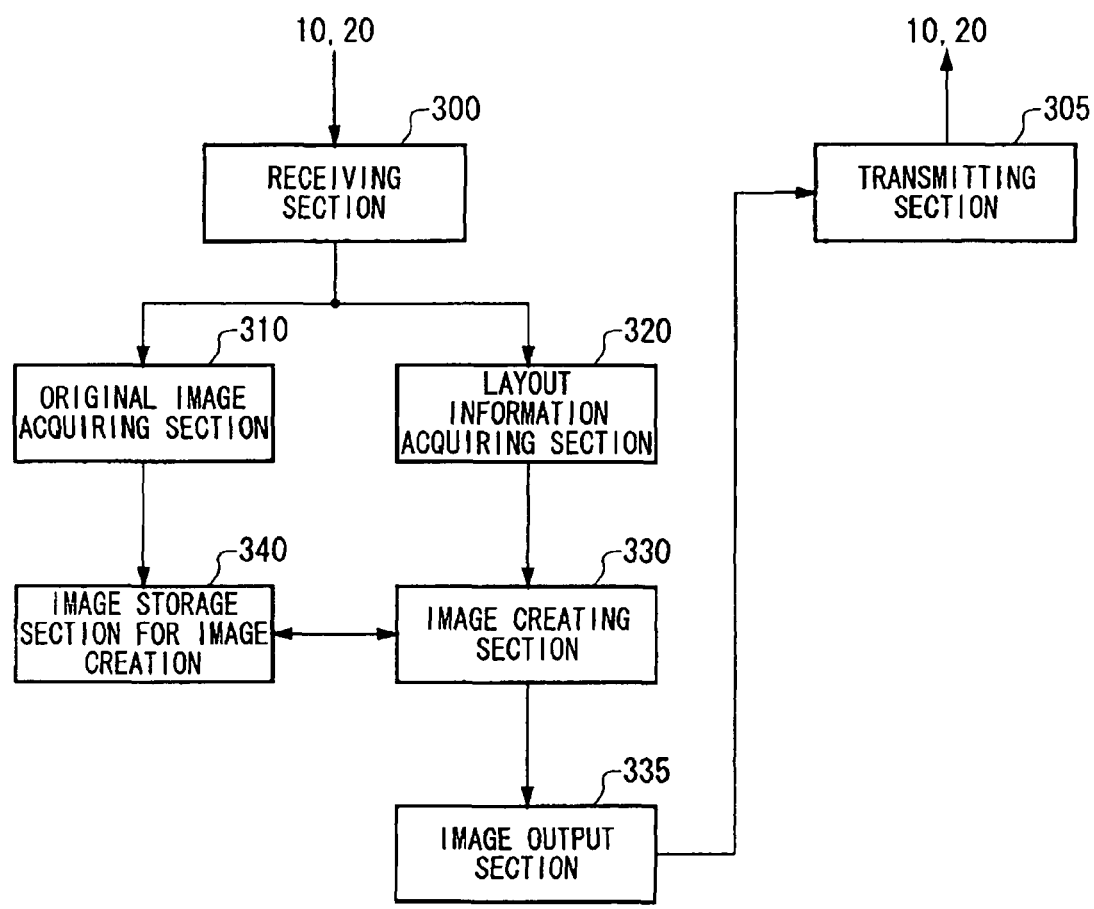
FIG. 4 is a block diagram showing the functional configuration of an image creating apparatus 30.

FIG. 4 shows an example of the functional configuration of an image creating apparatus 30 according to the present embodiment. The image creating apparatus 30 includes a receiving section 300, a transmitting section 305, an original image acquiring section 310, a layout information acquiring section 320, an image creating section 330, an image output section 335 and an image storage section for image creation 340. Here, the image creating apparatus 30 may further include a part of or all of the configuration and the function of the orderer apparatus 10 described above with reference to FIG. 1 and FIG. 2.

The receiving section 300 provides information received from the orderer apparatus 10 and the layout information generating apparatus 20 to a member having a predetermined function included in the image creating apparatus 30. Specifically, receiving the layout identification information stored in a storage medium such as a memory and the original image, the receiving section 300 provides the original image with layout identification information to the original image acquiring section 310. Additionally, receiving the layout information from the orderer apparatus 10 or the layout information generating apparatus 20, the receiving section 300 provides the layout information to the layout information acquiring section 320. Here, the receiving section 300 may receive the layout identification information and the original image through a network such as LAN, WAN and Internet.

The layout information acquiring section 320 acquires the layout information transmitted by the layout information transmitting section 255 included in the layout information generating apparatus 20 through the receiving section 300. Then, the layout information acquiring section 320 provides the acquired layout information to the image generating section 330. The original image acquiring section 310 acquires the original image from the orderer apparatus 10 through the receiving section 300. The original image acquiring section 310 also acquires the layout identification information associated with the acquired original image. The original image acquiring section 310 provides the acquired original image and layout identification information to the image storage section for image creation 340. The image storage section for image creation 340 stores the original image received from the original image acquiring section 310 in association with the layout identification information.

The image creating section 330 creates an image in which the original image is laid out based on the original image received from the orderer apparatus 10 and the layout information received from the layout information generating apparatus 20. Specifically, the image creating section 330 provides the layout identification information corresponding to the layout information received from the layout information acquiring section 320 to the image storage section 340 for image creation and extracts the original image corresponding to the low-capacity image included in the layout information. Then, the image creating section 330 lays out the extracted original image in the template according to the layout information to create an image. The image creating section 330 provides the created image to the image output section 335.

The image output section 335 prints the image created by the image creating section 330 on a paper medium. Additionally, the image output section 335 may write the image created by the image creating section 330 on a storage medium such as a DVD. Further, the image output section 335 may display the image created by the image creating section 330 on a monitor such as a TV. Then, the image output section 335 may provide the image created by the image creating section 330 to the orderer apparatus 10 connected to a network such as Internet through the transmitting section 305.

The image creating apparatus 30 according to the present embodiment can create the image desired to be created by the orderer by only providing order identification information, layout identification information stored on a recording medium such as a memory, and the original image to the image creating apparatus 30 through the memory by the orderer when the orderer desires to create an image. Thereby it is not necessary to select the original image to be laid out in the template by the orderer, so that the orderer can easily and speedily obtain the image in which the desired original image is laid out in the template.

Figure 5:
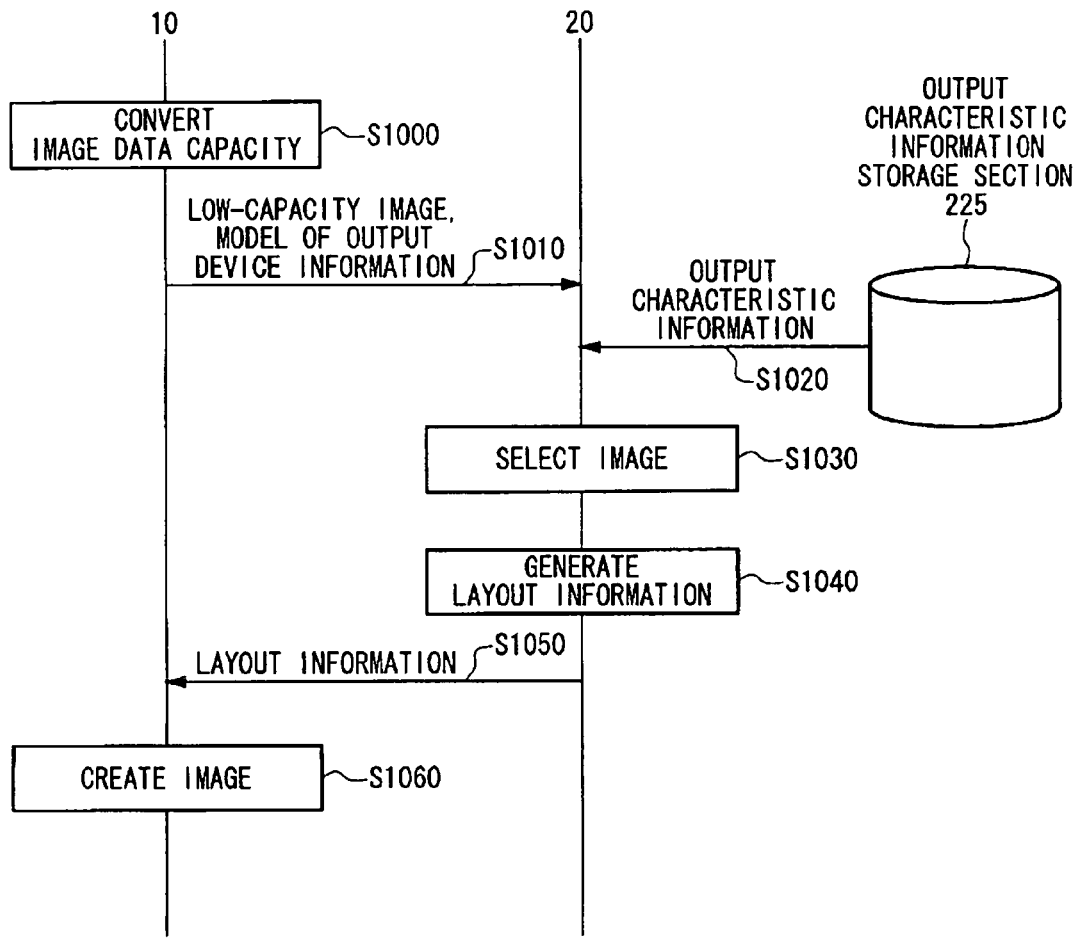
FIG. 5 is a flowchart showing a processing in an image creating system 40.

FIG. 5 shows an example of a flow of processing in an image creating system 40 according to the present embodiment. In the following description with reference to FIG. 5, the orderer apparatus 10 may be the image creating apparatus 30. Firstly, the image data capacity conversion section 120 converts the quality of an original image stored in the original image storage section 110 to create a low-capacity image in order to reduce the amount of data of the original image (S1000). The output device information acquiring section 160 included in the orderer apparatus 10 acquires type of output device information indicative of the type of output device included in the orderer apparatus 10. The orderer apparatus 10 provides the created low-capacity image and the acquired type of output information to the layout information generating apparatus 20 (S1010).

The layout information generating apparatus 20 extracts the output characteristic information corresponding to the type of output device information received from the orderer apparatus 10 from the output characteristic information storage section 225 which stores the output characteristic information in association with the type of output device information (S1020). Specifically, the layout information generating apparatus 20 provides the type of output device information acquired from the orderer apparatus 10 by the type of output device information acquiring section 230 to the output characteristic information storage section 225, and then, the output characteristic information storage section 225 provides the output characteristic information corresponding to the type of output device information to the output characteristic information acquiring section 220. The output characteristic information acquiring section 220 provides the output characteristic information to the image selecting section 240.

Then, the image selecting section 240 selects a low-capacity image to be laid out in the template from the low-capacity images received from the orderer apparatus 10 based on the output characteristic information received from the output characteristic information acquiring section 220 (S1030). Next, the image selecting section 240 provides the selected low-capacity image to the layout information generating section 250. Then, the layout information generating section 250 lays out the selected low-capacity image in the template to create the layout information on the low-capacity image (S1040). The Layout information generating apparatus 20 transmits the generated layout information to the orderer apparatus 10 through the layout information transmitting section 255 and the transmission control section 10 (S1050).

Receiving the layout information, the orderer apparatus 10 analyzes the layout information by the image extracting section 140 and extracts the original image corresponding to the low-capacity image included in the layout information. Then, the image output section 180 creates an image in which the original image is laid out in the template based on the extracted original image and the layout information (S1060). For Example, creating an album, the image output section 180 prints the original image laid out in the page of the album on a paper medium to create the album. Additionally, the image output section 180 may output the album to a display device such as the display 14 and causes the orderer to view the same. Here, the display device such as a monitor is an example of the display section 170.

The album creating system 40 according to the present embodiment can automatically select the original image appropriate to create an image by the output device dependent on the characteristic of the output device based on the type of output device information indicative of the type of output device included in the orderer apparatus 10. Thereby it is not necessary to select an original image appropriate for the output characteristic of the output device by the orderer, so that the orderer can easily and speedily output the image by using the output device included in the orderer apparatus 10.

Figure 6:
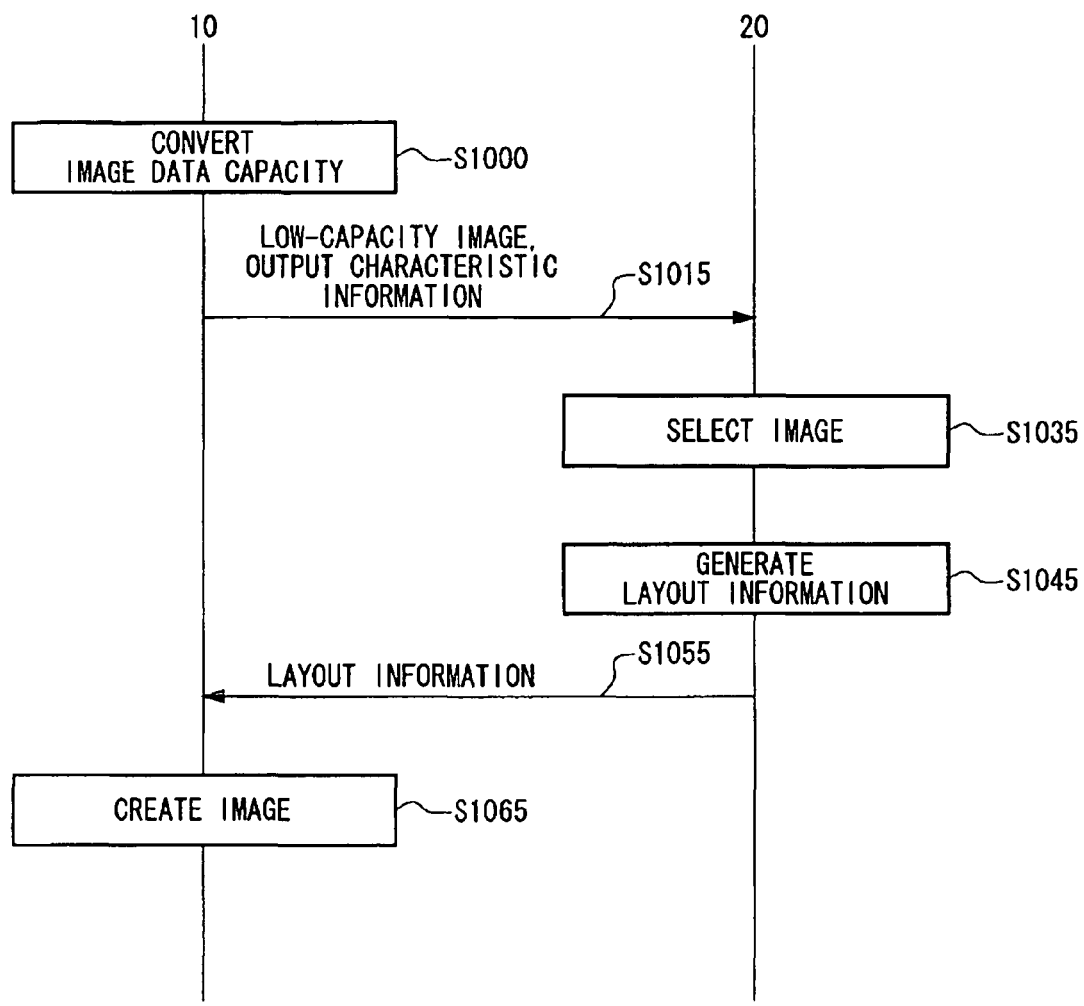
FIG. 6 is a flowchart showing a processing in the image creating system 40.

FIG. 6 shows an example of a flow of processing in the image creating system 40 according to the present embodiment. Here, the step the same as the reference numeral for each step of FIG. 5 operates as well as the step described above in FIG. 5, so that the repeated description is omitted. Additionally, in the following description with reference to FIG. 6, the orderer apparatus 10 may be the image creating apparatus 30.

Firstly, the image data capacity conversion section 120 included in the orderer apparatus 10 converts the quality of the original image stored in the original image storage section 110 to create a low-capacity image (S1000). The output device information acquiring section 160 included in the orderer apparatus 10 acquires output characteristic information indicative of the output characteristic of the output device included in the orderer apparatus 10. The orderer apparatus 10 provides the created low-capacity image and the acquired output characteristic information to the layout information generating apparatus 20 (S1015). Then, the image selecting section 240 included in the layout information generating apparatus 20 selects the low-capacity image corresponding to the original image to be laid out in the template from the low-capacity images received from the orderer apparatus 10 based on the output characteristic information received from the orderer apparatus 10.

Next, the image selecting section 240 provides the low-capacity image selected by the layout information generating section 250. Then, the layout information generating section 250 lays out the low-capacity image selected by the image selecting section 240 in the template to create layout information (S1045). The layout information generating section 20 transmits the generated layout information to the orderer apparatus 10 through the layout information transmitting section 255 and the transmission control section 205 (S1055).

The orderer apparatus 10 which received the layout information extracts the original image corresponding to the low-capacity image included in the layout information by the image extracting section 140. Then, the image output section 180 creates an image based on the extracted original image and the layout information (S1065). For example, creating an album, the image output section 180 prints the original image laid out in the page of the album on a paper medium to create the album. Additionally, the image output section 180 may record the album on a recording medium such as a DVD. Further, the image output section 180 outputs the album on a display device such as a monitor and causes the orderer to view the same.

The image creating system according to the present embodiment can automatically select the original image appropriate to create an image by the output device according to the output characteristic of the output device based on the output characteristic information indicative of the output characteristic of the output device included in the orderer apparatus 10. Thereby it is not necessary to select the original image appropriate for the output characteristic of the output device by the orderer, so that the orderer can easily and speedily output the image by using the output device included in the orderer apparatus 10.

Figure 7:
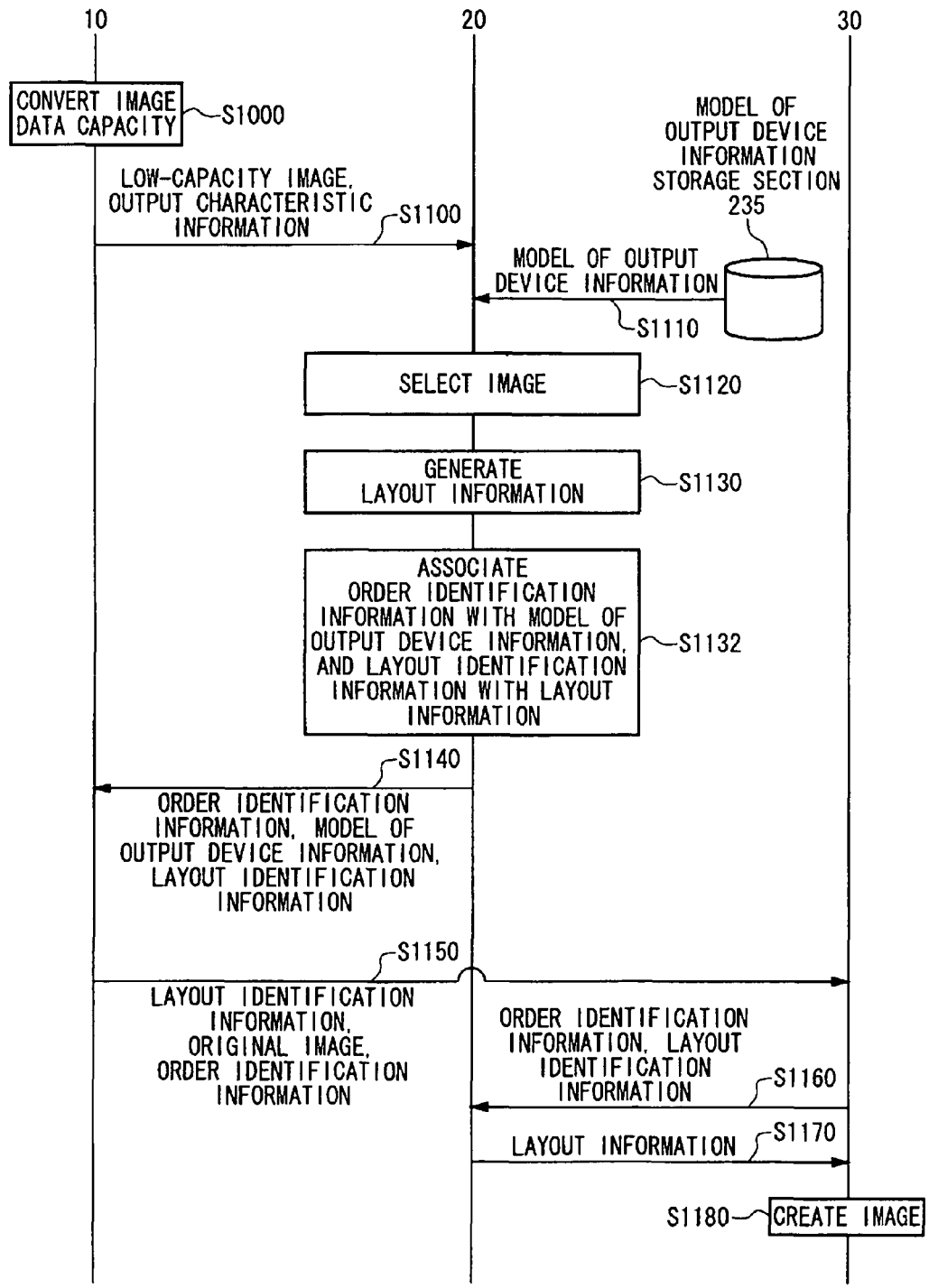
FIG. 7 is a flowchart showing a processing in the image creating system 40.

FIG. 7 shows an example of a flow of processing of the image creating system 40 according to the present embodiment. Firstly, the image data capacity conversion section 120 included in the orderer apparatus 10 converts the quality of the original image stored in the original image storage section 110 to create a low-capacity image (S1000). The orderer apparatus 10 acquires information on the image desired to output by the orderer being output characteristic information, such as the size of paper on which the image is printed and the type of paper. The orderer apparatus 10 provides the created low-capacity image and the output characteristic information to the layout information generating apparatus 20 (S1100).

The layout information generating apparatus 20 extracts type of output device information corresponding to the output characteristic information received from the orderer apparatus 10 from the type of output device storage section (S1110). Specifically, acquiring the output characteristic information from the orderer apparatus 10, the output characteristic information acquiring section 220 provides the acquired output characteristic information to the type of output device information storage section 235. Then, the type of output information storage section 235 provides the type of output device information stored therein in association with the received output characteristic information to the type of output information acquiring section 230. Additionally, the type of output device information storage section 235 may also provide output device location information indicative of a location at which the output device is installed, which is stored therein in association with the type of output device information to the type of output device information acquiring section 230. Here, a plurality of the output device locations may be indicated by the output device location information provided by the type of output device information storage section 235.

Then, the image selecting section 240 selects a low-capacity image to be laid out in the template from the low-capacity images received from the orderer apparatus 10 based on the output characteristic information (S1120). Next, the layout information generating section 250 lays out the low-capacity image selected by the image selecting section 240 in the template to create layout information (S1130). The layout information generating apparatus 20 associates the generated layout information, the layout identification information and the type of output device information with the order identification information (S1132).

The layout information generating apparatus 20 provides the order identification information, the type of output device information, the output device location information and the layout identification information to the orderer apparatus 10 (S1140). Receiving the order identification information, the type of output device information, the output device location information and the layout identification information, the orderer apparatus 10 stores the order identification information, the type of output device information, the output device location information and the layout identification information on a recording medium such as a memory. Additionally, the orderer apparatus 10 causes the orderer to view the location of the output device based on the received output device location information of the output device. Here, receiving a plural pieces of output device location information, the orderer apparatus 10 may cause the orderer to view the plural pieces of device location information.

Then, the orderer provides the order identification information, the type of output device information and the layout identification information to the output device installed at the location where the orderer desires to create an image through a recording medium such as a memory (S1150). Here, the recording medium such as a memory may be a recording medium included in a hand-held terminal such as a cellular phone, a portable image viewer and a portable music player.

The image creating apparatus 30 provides the received order identification information and layout identification information to the layout information generating apparatus 20 and requests to transmit layout information corresponding to the layout identification information (S1160). The layout information generating apparatus 20 transmits the layout information corresponding to the layout identification information received from the image creating apparatus 30 to the image creating apparatus 30 (S1170). Receiving the layout information from the layout information generating apparatus 20, the image creating apparatus 30 extracts the original image corresponding to the low-capacity image included in the layout information and lays out the original image in the template based on the layout information to create an image (S1180).

The image creating system 40 according to the present embodiment automatically generates layout information on the low-capacity image based on the information on the image desired to create by the orderer when the orderer transmits the information on the image desired to create by the orderer and the layout information apparatus 20 to the layout information generating apparatus 20. Next, the image creating system 40 transmits the layout identification information and the type of output device information on the output device appropriate to create the image to the orderer apparatus 10 along with the output location information. Then, the orderer stores the orderer identification information, the layout identification information and the original image in such as a memory and provides the same to the output device indicated by the output location information to create a desired image. Thereby the orderer can create the image at a location where the orderer desires to create the image without selecting the original image appropriate for the image desired to create by the orderer. Therefore, the orderer can easily and speedily obtain the desired image.

Figure 8:
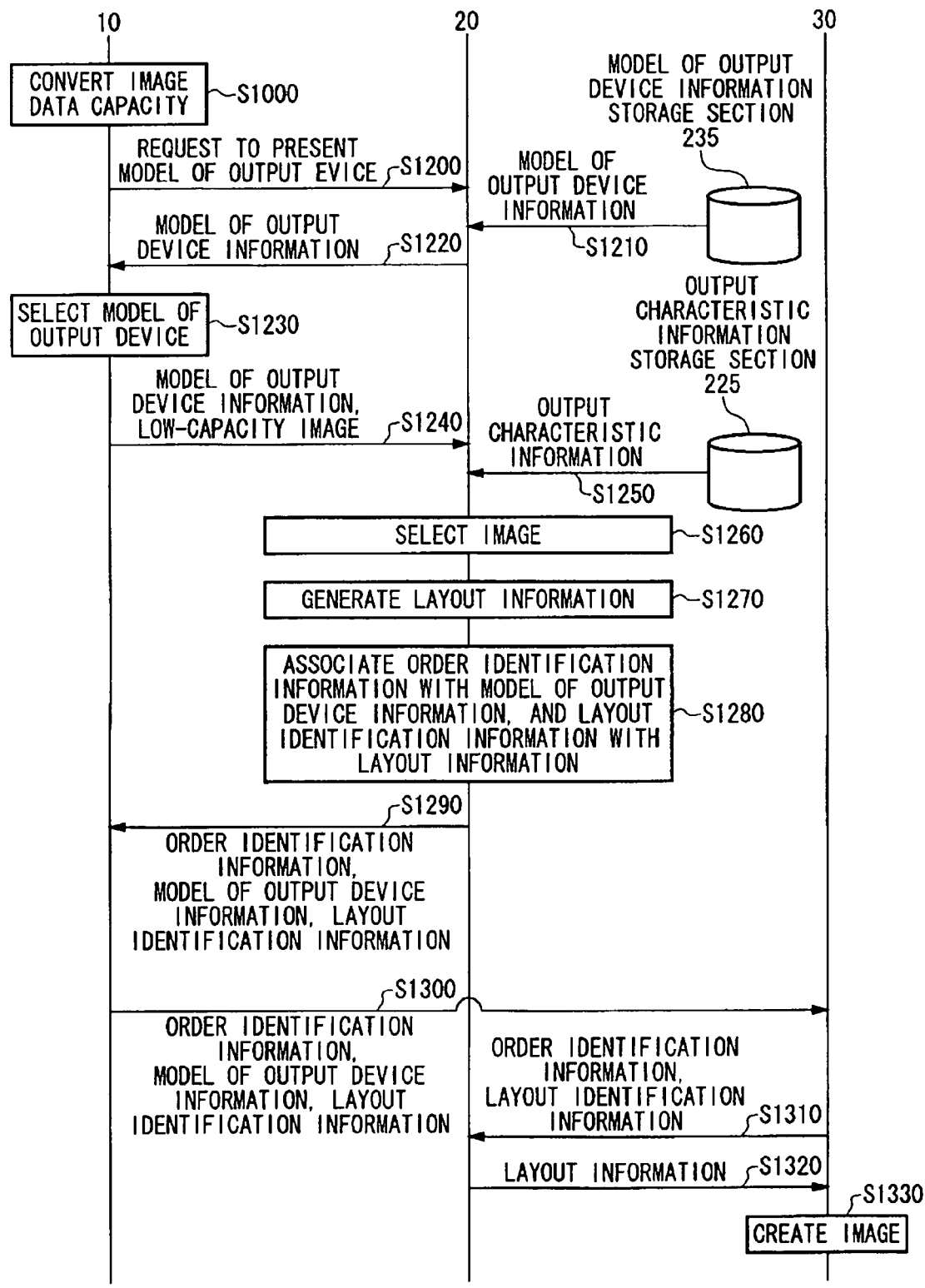
FIG. 8 is a flowchart showing a processing in the image creating system 40.

FIG. 8 shows an example of a flow of processing in the image creating system 40 according to the present embodiment. Firstly, the image data capacity conversion section 120 included in the orderer apparatus 10 converts the quality of the original image stored in the original image storage section 110 to create a low-capacity image (S1000). Then, the orderer apparatus 10 requests the layout information generating apparatus 20 to present type of output device information indicative of the type of an output device of a computer in a shop (S1200). Receiving the request for presenting the type of output device information from the orderer apparatus 10, the layout information generating apparatus 20 extracts type of output device information from the type of output device information storage section 235 (S1210). Then, the layout information generating apparatus 20 transmits the extracted type of output device information to the orderer apparatus 10 (S1220). The type of output device information may include a location of the shop at which the computer is installed, the output characteristic of the output device (the size and the type of paper), availability of medium other than paper to output as an album (information on whether it can be recorded on a recording medium such as a DVD) and the fee structure.

Receiving the type of output device information, the orderer apparatus 10 presents information on the type of output device to the orderer. Then, the orderer apparatus 10 causes the orderer to select the type of output device by which the orderer desires to created an image (S1230). The orderer apparatus 10 transmits the type of output device information on the type of output device selected by the orderer and the low-capacity image to the layout information generating apparatus 20 (S1240). The output characteristic information acquiring section 220 included in the layout information generating apparatus 20 extracts the output characteristic information corresponding to the type of output device information received from the orderer apparatus 10 from the output characteristic information storage section 225 (S1250). Then, the image selecting section 240 selects a low-capacity image to be laid out in the template by using the low-capacity images received from the orderer apparatus 10 based on the extracted output characteristic information (S1260).

Next, the layout information generating section 250 receives the low-capacity image selected by the image selecting section 240 and generates layout information on the low-capacity image (S1270). The layout information generating section 250 associates order identification information with the type of output device information, and layout information with layout identification information (S1280). Then, the layout information generating section 250 provides the order identification information, the type of output device information and the layout identification information to the orderer apparatus 10 through the layout information transmitting section 255 and the transmission section 205 (S1290).

Receiving the order identification information, the type of output device information and the layout identification information from the layout information generating apparatus 20, the orderer apparatus 10 stores the order identification information, the layout identification information and the original image in a storage medium such as a memory. Then, the order identification information, the layout information and the original image stored in the recording medium such as a memory are provided to the image creating apparatus 30 through the storage medium such as a memory (S1300). Here, the order identification information, the layout information and the original image may be provided from the orderer apparatus 10 to the image creating apparatus 30 through a network such as LAN, WAN and Internet. The image creating apparatus 30 transmits the layout identification information associated with the order identification information to the layout information generating apparatus 20 (S1310).

The layout information generating apparatus 20 provides layout information corresponding to the layout identification information received from the image creating apparatus 30 to the image creating apparatus 30 (S1320). Receiving the layout information, the image creating apparatus 30 extracts the original image corresponding to the low-capacity image included in the layout information and lays out the extracted original image in a layout frame in the template according to the layout information to create an image (S1330).

The image creating system 40 according to the present embodiment can automatically select the original image appropriate for the output characteristic of the output device selected by the orderer and automatically create layout information. Then, the orderer stores the layout identification information corresponding to the layout information and the original image in the recording medium such as a memory. Next, the orderer provides the layout identification information and the original image stored in the recording medium such as a memory to the image creating apparatus 30 by which the orderer desires to create an image, so that an image desired to create by the orderer can be created automatically. Thereby the image appropriate for an output device by which the orderer desires to create the image can be automatically created by the output device, so that the orderer can easily and speedily obtain the desired image by the desired output device.

Figure 9:
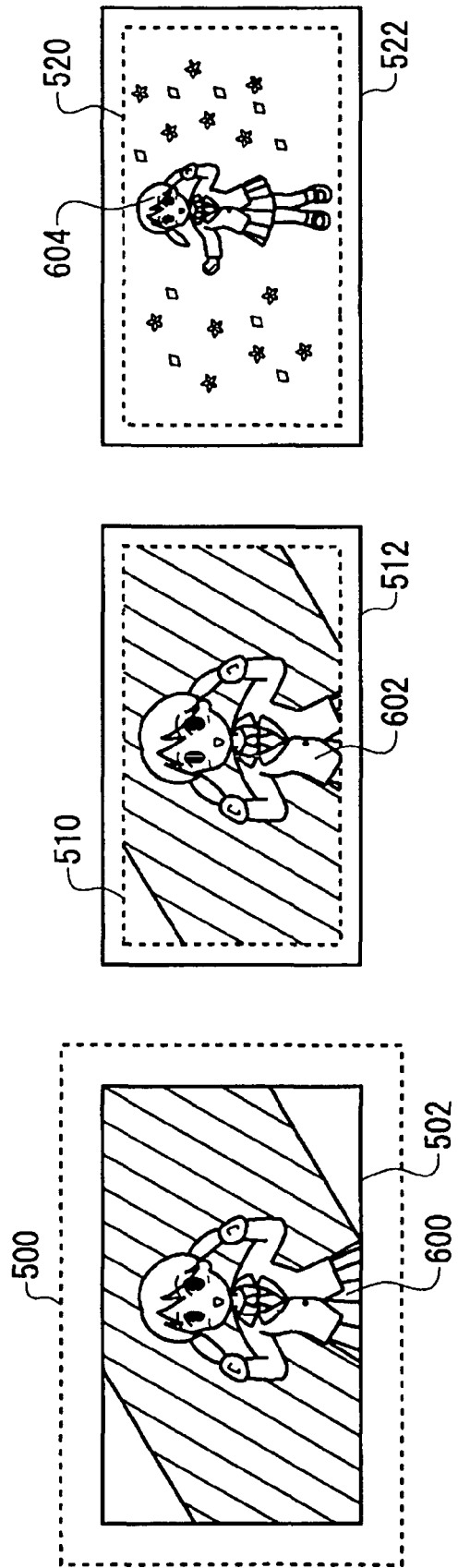
FIG. 9 shows layout information.

FIG. 9 shows an example of layout information generated by the layout information generating apparatus 20 according to the present embodiment. Specifically, the output characteristic information acquiring section 220 acquires information indicative of a frameless printing as output characteristic information. For example, the output characteristic information acquiring section 220 acquires output characteristic information indicating that the edge of a printing range 500 for which the printing device can actually print does not overlap with a medium 502. In this case, the image selecting section 240 may select a low-capacity image corresponding to the original image in which the upper part of a main subject (600)'s body is shown. Additionally, when the output characteristic information indicates the frameless printing, the image selecting section 240 may select a template in which a background pattern is formed up to the edge of the medium 502 as the template in which the original image should be laid out.

Meanwhile, when the output characteristic information acquiring section 220 acquires output characteristic information indicative of a framed printing, that is to say, the output characteristic information acquiring section 220 acquires output characteristic information indicating that the edge of a printing range 510 overlaps with a medium 512, the image selecting section 240 does not select a low-capacity image corresponding to the original image in which the upper part of the subject (602)'s body is shown. In other words, when the output characteristic information indicates the framed printing, the image selecting section 240 may select a low-capacity image as follows. For example, the output characteristic information acquiring section 220 acquires output characteristic information indicating that a printing range 520 overlaps with a medium 522. In this case, the image selecting section 240 may select a low-capacity image corresponding to the original image including the whole of a main subject. Additionally, when the output characteristic information indicates the framed printing, the image selecting section 240 may select a template having the background pattern in which the border line between the original image and the medium 522 is little visible at the edge of the medium 522 as the template in which the original image should be laid out.

Figure 10:
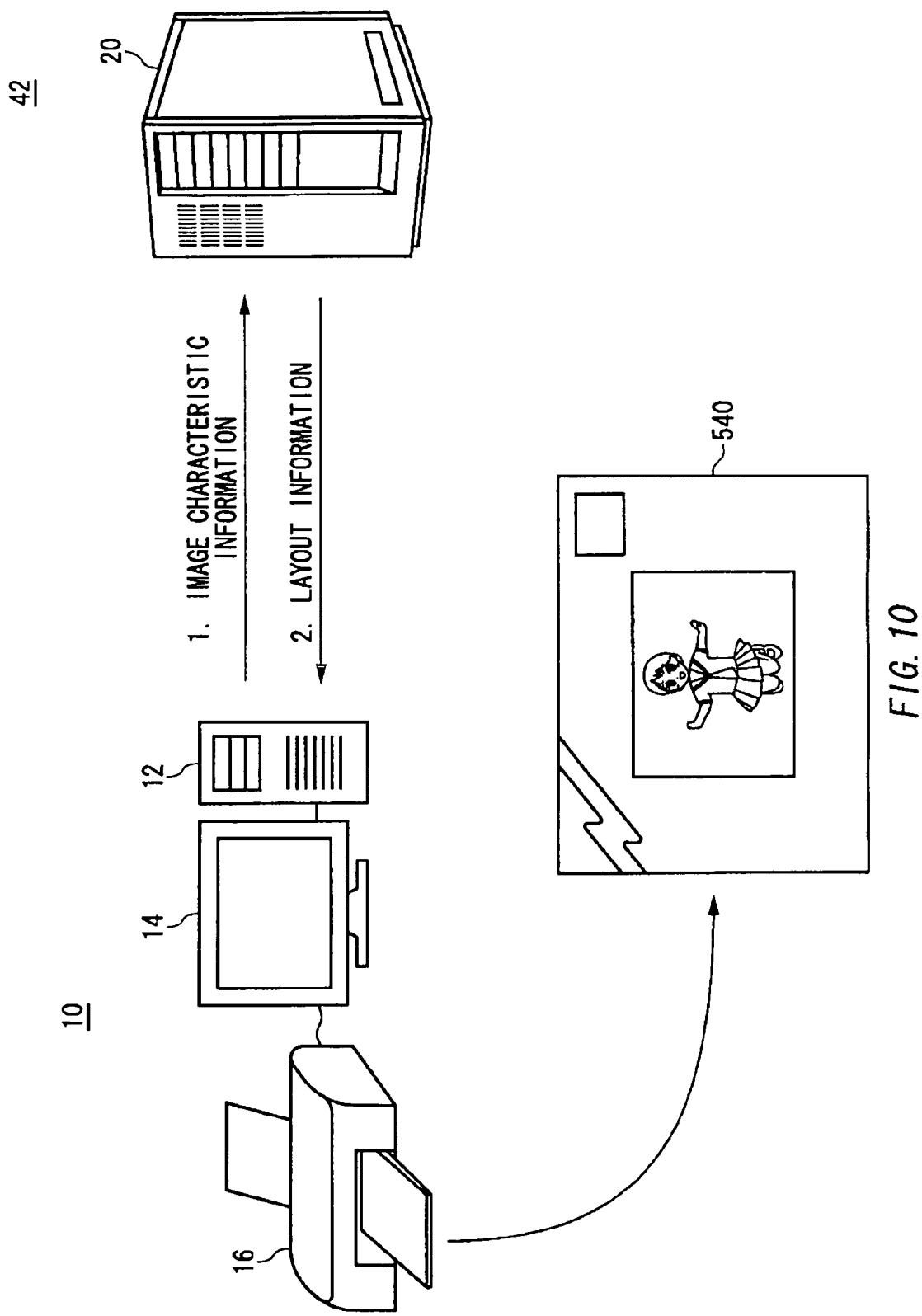
FIG. 10 is a schematic diagram of an image creating system 42.

FIG. 10 is a schematic diagram of an image creating system 42 according to another embodiment of the present invention. The image creating system 42 includes an orderer apparatus 10 and the layout information generating apparatus 20. The orderer apparatus 10 includes a main body 12, a display 14 and a printer 16. The orderer apparatus 10 extracts image characteristic information for a layout candidate image being an original image to be laid out in the image desired to create by the orderer. The image characteristic information may be information indicative of a position of the main subject on the original image, information indicative of the size of the main subject on the original image and information indicative of the time and date at which the original image is captured. The image characteristic information may be acquired by analyzing the original image by the orderer apparatus 10. Additionally, the image characteristic information may be analyzed by an image capturing apparatus for capturing the original image and added to the original image.

The orderer apparatus 10 associates the image characteristic information of the original image with an identifier which identifies the original image and transmits the same to the layout information generating apparatus 20. The layout information generating apparatus 20 selects the original image to be laid out in the template based on the image characteristic information received from the orderer apparatus 10. Additionally, after selecting a template in which the original image should be laid out based on the image characteristic information, the layout information generating apparatus 20 may select the original image to be laid out in the selected template. The layout information generating apparatus 20 generates layout information by which the identifier for identifying the original image is associated with a layout frame of the selected template. Then, the layout information generating apparatus 20 transmits the generated layout information to the orderer apparatus 10.

The orderer apparatus 10 receives the layout information from the layout information generating apparatus 20. The orderer apparatus 10 reads the identifier associated with the layout frame of the template indicated by the layout information. Then, the orderer apparatus 10 extracts the original image identified by the read identifier. Next, the orderer apparatus 10 lays out the extracted original image in the layout frame according to the layout information to create an image. The orderer apparatus 10 displays the created image on the display 14. Additionally, the orderer apparatus 10 may print the created image on a card 540 by the printer 16.

According to the image creating system 42 of the present embodiment, the orderer can acquire the layout information that the original image is appropriately laid out in the template only by transmitting the image characteristic information of the original image to the layout information generating apparatus 20. Then, the orderer can output the image by the orderer apparatus 10 based on the layout information acquired from the layout information generating apparatus 20. Thereby even if the designer updates the layout of the template to conform to the trend, the orderer can create an image in which the original image is laid out without regard to the layout of the template. Additionally, since the layout information is generated by the layout information generating apparatus 20, the know-how of the designer is not conveyed to the orderer but can be protected.

Figure 11:
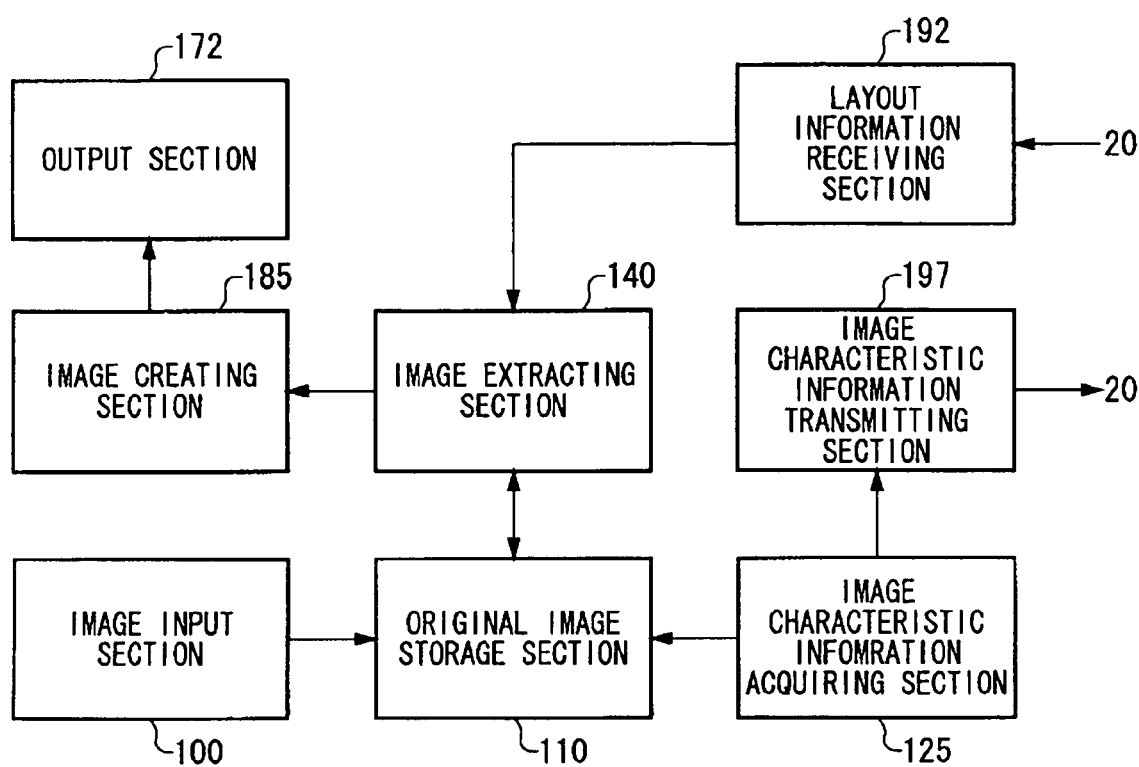
FIG. 11 is a block diagram showing the functional configuration of an orderer apparatus 10.

FIG. 11 shows the functional configuration of an orderer apparatus 10 according to the present embodiment. The orderer apparatus 10 for creating images includes an image input section 100, an original image storage section 110, an image characteristic information acquiring section 125, an image extracting section 140, an image creating section 185, an output section 172, a layout information receiving section 192 and an image characteristic information transmitting section 197. Here, the orderer apparatus 10 may further include a part of or all of the function and the configuration of the orderer apparatus 10 described above with reference to FIG. 1-FIG. 8. Additionally, the components having the reference numerals the same as those of the components described above with reference to FIG. 1-FIG. 8 have the functions substantially the same as those of the components in FIG. 1-FIG. 8, so that the repeated description is omitted.

The image input section 100 receives an original image from the outside of the orderer apparatus 10 through a memory and a network such as Internet. Additionally, the image input section 100 may acquire image characteristic information in association with the original image. The image input section 100 provides the received original image and the image characteristic information to the original image storage section 110. The original image storage section 110 stores the original image and the image characteristic information received from the image input section 100 in association with the identifier to uniquely identify the original image. The original image storage section 110 provides the original image to the image extracting section 140 based on the control of the image extracting section 140. Additionally, the original image storage section 110 provides the original image and the image characteristic information to the image characteristic information acquiring section 125 based on the control of the image characteristic information acquiring section 140.

The image characteristic information acquiring section 125 acquires the image characteristic information indicative of the characteristic of the original image in association with an original image identifier to identify the original image. Here, the image characteristic information acquiring section 125 may extract the original image stored in the original image storage section 110 and analyze the extracted original image to acquire image characteristic information. Here, the image characteristic information may include the position of the main subject on the original image, the size of the main subject on the original image and the time and date at which the original image is captured. Additionally, the image characteristic information may be the identification information on the subject of the original image (for example, information indicating whether the subject is a person, and information indicating who is the person if the subject is the person), and information indicative of the facial expression of the person in the original image, whether the eyes of the person are opened, the pose of the person, the orientation of the person's body on the image and the orientation of the person's face on the image.

The image characteristic information may be information indicative of the structure line of the original image such as the vanishing point of the original image, the position of the horizontal line included in the original image and the distribution of the spatial frequency components of the original image. Further, the image characteristic information may be image capturing information of the original image when the original image is captured, such as the identification information of the image capturing device, and information indicative of the lens type, the image capturing location, the kind of light source at image-capturing, the focusing distance, the focal distance and the image capturing mode such as a continuous shooting mode, a distant landscape mode, a close view mode, a night view mode, a close-up mode, a landscape mode, a party mode, a red-eye reduction mode and a portrait mode. The image characteristic information acquiring section 125 provides the acquired image characteristic information to the image characteristic information transmitting section 197 in association with the original image identifier.

The image characteristic information transmitting section 197 transmits the image characteristic information received from the image characteristic information acquiring section 125 to the layout information generating apparatus 20 in association with the original image identifier. Here, the image characteristic information transmitting section 197 may detect the output characteristic information on the output section 172 and transmit the detected output characteristic information to the layout information generating apparatus 20. Additionally, the image characteristic information transmitting section 197 may transmit information indicative of the theme of the image desired to create by the orderer to the layout information generating apparatus 20. The layout information receiving section 192 receives layout information generated by associating the original image identifier with the layout flame of the template by the layout information generating apparatus 20. The layout information receiving section 192 provides the received layout information to the image extracting section 140.

The image extracting section 140 acquires the original image identifier associated with the layout frame of the template indicated by the layout information received from the layout information receiving section 192. Then, the image extracting section 140 extracts the original image identified by the acquired original image identifier from the original image storage section 110. The image extracting section 140 provides the extracted original image and the layout information to the image creating section 185. The image creating section 185 lays out the original image received from the image extracting section 140 into the layout frame in the template to create an image. The image creating section 185 provides the created image to the output section 172. The output section 172 outputs the image received from the image creating section 185. The output section 172 may be the display section 170, the printer 16 and a writing device for writing information on a recording medium such as a DVD.

Figure 12:
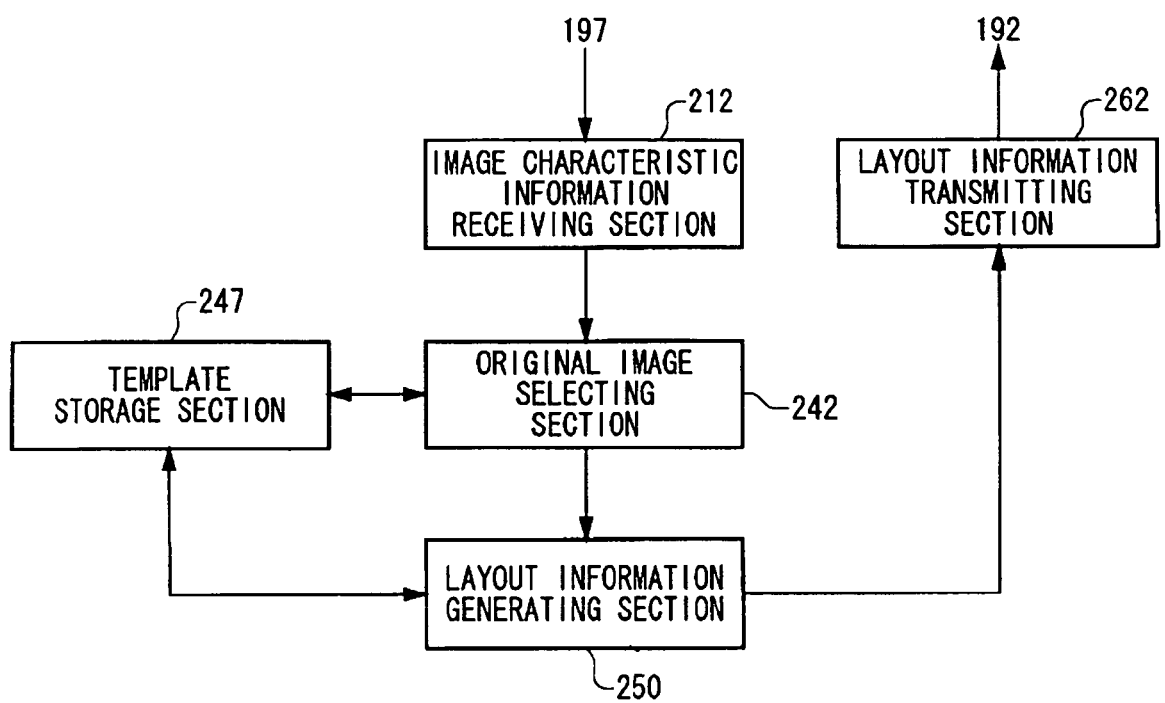
FIG. 12 is a block diagram showing the functional configuration of a layout information generating apparatus 20.

FIG. 12 shows an example of the functional configuration of a layout information generating section 20 according to the present embodiment. The layout information generating apparatus 20 for laying out images provided by the orderer includes an image characteristic information receiving section 212, an original image selecting section 242, a template storage section 247, a layout information generating section 250 and a layout information transmitting section 262. Here, the layout information generating section 20 may further include a part of or all of the function and the configuration of the layout information generating apparatus 20 described above with reference to FIG. 1-FIG. 8. Additionally, the components having the reference numerals the same as those of the components described above with reference to FIG. 1-FIG. 8 have the functions substantially the same as those of the components in FIG. 1-FIG. 8, so that the repeated description is omitted.

The image characteristic information receiving section 212 receives image characteristic information indicative of the characteristic of the original image in association with an original image identifier from the image characteristic information transmitting section 197. Additionally, the image characteristic information receiving section 212 may receive information indicative of the theme of the image from the image characteristic information transmitting section 197. The image characteristic information receiving section 212 provides the received image characteristic information in association with the original image identifier to the original image selecting section 242. The template storage section 247 stores a template including a layout frame into which the original image is laid out therein. For example, the template storage section 247 may store templates for a card, a postcard, a calendar, an album, a photo collection and an image collection therein. Image characteristic information for identifying the original image to be laid out in the layout frame may be previously associated with the layout frame included in the template. The template storage section 247 provides the template to the original image selecting section 242 and the layout information generating section 250.

The original image selecting section 242 selects the original image to be laid out in the template based on the image characteristic information received in association with the original image identifier by the image characteristic information receiving section 212. Specifically, the original image selecting section 242 firstly acquires a template from the template storage section 247. For example, the original image selecting section 242 may acquire the template from the template storage section 247 based on information indicative of the theme of the image received from the orderer apparatus 10 by the image characteristic information receiving section 212. The theme of the image indicates a birthday, an entrance ceremony, an excursion, an athletic festival, a graduation ceremony, an wedding ceremony, a growth record and a trip. The original image selecting section 242 reads the image characteristic information previously associated with the layout frame included in the template acquired from the template storage section 247 and selects the original image identifier corresponding to the read image characteristic information.

For example, when the image characteristic information previously associated with the layout frame indicates that the main subject to be included in the original image is a specific person, the original image selecting section 242 selects the original image identifier to identify the original image including the specific person. Additionally, when the image characteristic information previously associated with the layout frame is information indicating that the vanishing point included in the original image should be placed at a predetermined position of the original image, the original image selecting section 242 selects the original image identifier corresponding to the original image in which the vanishing point is placed at the predetermined position. The original image selecting section 242 provides the selected original image identifier to the layout information generating section 250.

The layout information generating section 250 generates layout information by associating the original image identifier for identifying the original image selected by the original image selecting section 242 with the layout frame. Specifically, the layout information generating section 250 acquires the template selected by the original image selecting section 242 from the template storage section 247. Then, the layout information generating section 250 associates the original image identifier selected by the original image selecting section 242 with the layout frame included in the template acquired from the template storage section 247 to create layout information. The layout information generating section 250 provides the generated layout information to the layout information transmitting section 262. The layout information transmitting section 262 transmits the layout information received from the layout information generating section 250 to the orderer apparatus 10. Then, the layout information transmitting section 262 causes the orderer apparatus 10 to create an image in which the original image identified by the original image identifier is laid out according to the layout information transmitted to the orderer apparatus 10.

Figure 13:
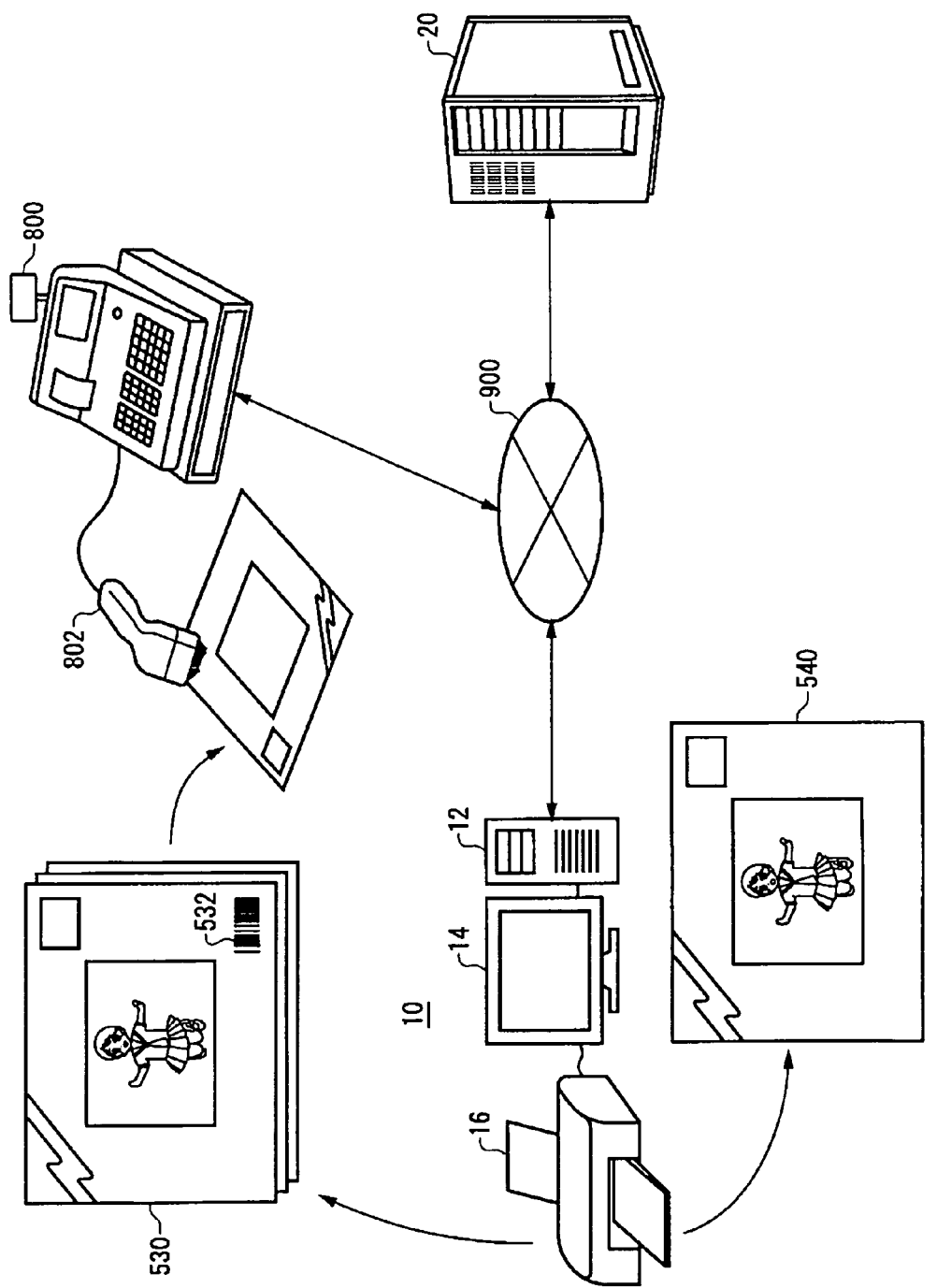
FIG. 13 is a schematic diagram of an image creating system.

FIG. 13 is a schematic diagram of an image creating system 44 according to another embodiment of the present invention. The image creating system 44 according to the present embodiment includes an orderer apparatus 10, a layout information generating apparatus 20 and a cash register 800. The cash register 800 includes a bar code reader 802. Here, the orderer apparatus 10 may include a part of or all of the function and the configuration of the orderer apparatus 10 described above with reference to FIG. 1-FIG. 12. In the same way, the layout information generating apparatus 20 may include a part of or all of the function and the configuration of the layout information generating apparatus 20 described above with reference to FIG. 1-FIG. 12.

The orderer apparatus 10 creates a low-capacity image obtained by reducing the amount of data of the original image. Then, the orderer apparatus 10 transmits the generated low-capacity image to the layout information generating apparatus 20 through a network 900 such as Internet. Here, the orderer apparatus 10 may transmit the image characteristic information on the original image corresponding to the low-capacity image to the layout information generating apparatus 20. Additionally, the orderer apparatus 10 transmits the output characteristic information on the output device such as the printer 16 for printing images to the layout information generating apparatus 20.

The layout information generating apparatus 20 selects the low-capacity image corresponding to the original image to be laid out in an image to be created based on the low-capacity image and the output characteristic information received from the orderer apparatus 10. Here, the image to be created may be a postcard, a calendar, an album and an image collection including a plurality of original images. Then, the layout information generating apparatus 20 lays out the selected low-capacity image into the layout frame of the template to create an image sample of the low-capacity image. The layout information generating apparatus 20 may create a plurality of image samples. Here, the layout information generating apparatus 20 creates the image samples of only a part of the plurality of low-capacity images included in the generated layout information.

For example, creating an album, the layout information generating apparatus 20 creates an image sample of only a part of the plurality of pages included in the album. Additionally, the layout information generating apparatus 20 may associate order information with the image sample in order to be able to order the layout information corresponding to the created image sample. The layout information generating apparatus 20 further associates a layout information identifier for identifying the layout information corresponding to the image sample with the image sample. The layout information generating apparatus 20 associates the order information and the layout information identifier with each of the plurality of created image samples and transmits the same to the orderer apparatus 10 through the network 900.

The orderer apparatus 10 outputs the image sample received from the layout information generating apparatus 20 by the printer 16 as an example of the output device. Specifically, the orderer apparatus 10 prints a sample 530 by the printer 16. In this case, the orderer apparatus 10 reads the order information associated with each of the plurality of samples and prints order information indicated by such as a bar cord 532 on the samples 530. The orderer refers the plurality of samples 530 on which the order information are printed to check the layout and color tone of the image. Then, the orderer selects an sample 530 of the image desired to create among the plurality of samples 530 and brings the same to an accounting device such as the cash register 800. Here, the cash register 800 may be installed in a shop such as a convenience store or a kiosk.

When the orderer brings the sample 530 to the shop and pays a fare, the bar cord 532 of the sample 530 brought by the orderer is read by such as a bar cord reader 802 at the cash register. Here, when a plurality of image samples are displayed on the display 14 of the orderer apparatus 10 and the orderer selects a desired image sample among the plurality of image samples, a computerized account settlement may be performed on the orderer apparatus 10. When the orderer pays a fare for the layout information, the cash register 800 or the orderer apparatus 100 transmits to the layout information generating apparatus 20 the layout information identifier corresponding to the image sample along with the order information of the image sample corresponding to the layout information for which the orderer pays a fare.

Receiving the order information and the layout information identifier, the layout information generating apparatus 20 transmits the layout information identified by the layout information identifier to the orderer apparatus 10. The orderer apparatus 10 receives the layout information provided from the layout information generating apparatus 20. Then, the orderer apparatus 10 creates an image in which the original image is laid out in the layout frame included in the template according to the received layout information. Then, the orderer apparatus 10 prints the image created on such as the card 540 by the printer 16. Here, the orderer apparatus 10 may print the created image on pages of a postcard, a poster or an album by the printer 16.

Figure 14:
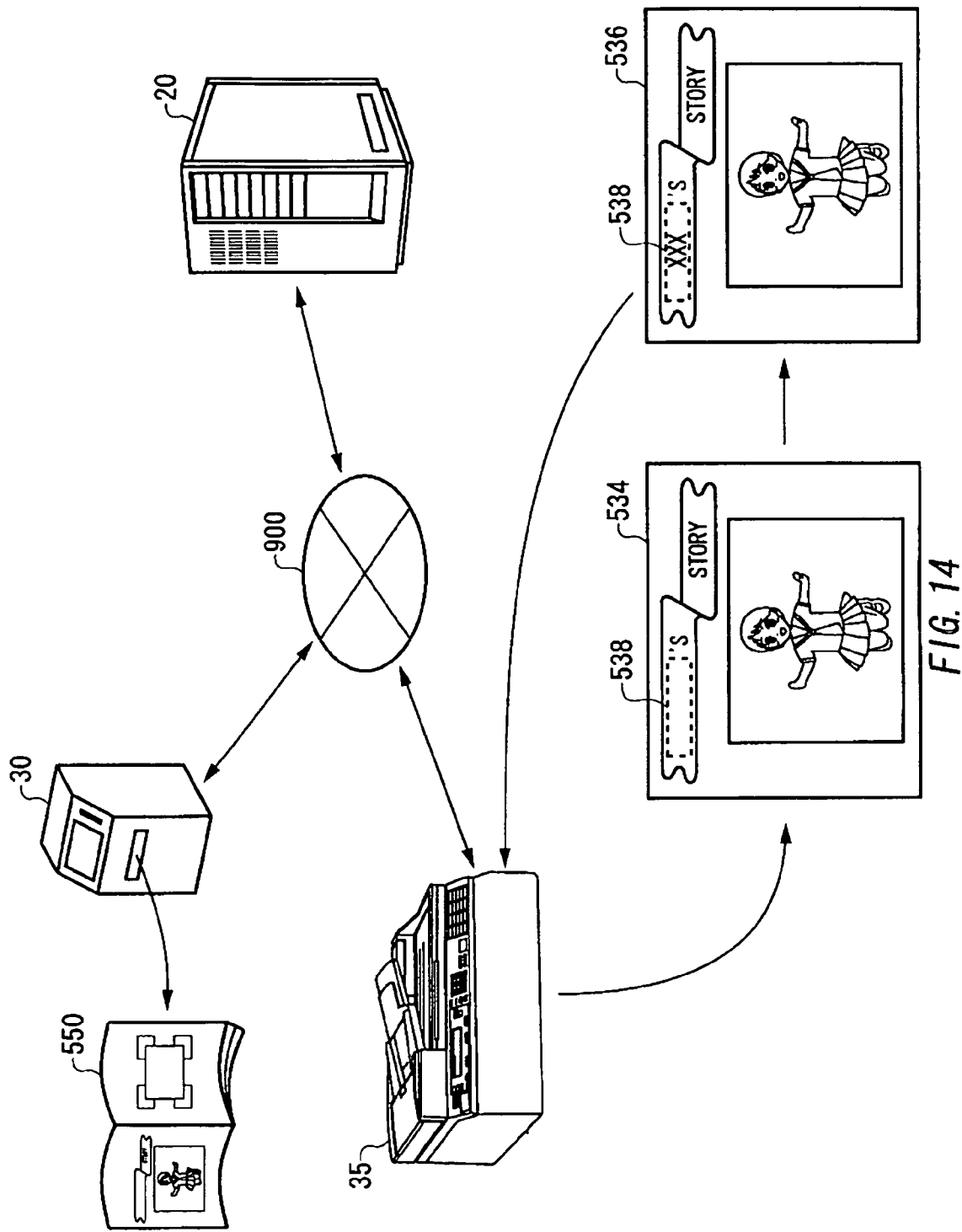
FIG. 14 is a schematic diagram of an image creating system.

FIG. 14 is a schematic diagram of an image creating system 46 according to another embodiment of the present invention. The image creating system 46 according to the present embodiment includes a layout information generating apparatus 20, an image creating apparatus 30 and a multifunction printer 35. Here, the multifunction printer 35 may include a scanner function, a fax transmission function and a communication function to communicate with the layout information generating apparatus 20. Here, the layout information generating apparatus 20 may include a part of or all of the function and the configuration of the layout information generating apparatus 20 described above with reference to FIG. 1-FIG. 12. In the same way, the image creating apparatus 30 may include a part of or all of the function and the configuration of the image creating apparatus 30 described above with reference to FIG. 1-FIG. 12. Additionally, the image creating system 46 may further include the orderer apparatus 10 described above with reference to FIG. 1-FIG. 13.

Firstly, the image creating apparatus 30 or the orderer apparatus 10 transmits a low-capacity image to the layout information generating apparatus 20 through the network 900. Then, layout information generating apparatus 20 transmits a sample 534 to the multifunction printer 35 through the network 900. For example, the layout information generating apparatus 20 transmits the sample 534 to the multifunction printer 35 by fax. The multifunction printer 35 prints the sample 534. A text frame 538 in which the order information is filled may be laid out in the sample 534. The orderer fills the name of a person included in the image as shown in a sample 536.

Filling the orderer information in the text frame 538, the orderer transmits the sample 536 from the multifunction printer 35 to the layout information generating apparatus 20. The layout information generating apparatus 20 reads the sample 536 received from the multifunction printer 35 and incorporates the orderer information filled in the text frame 538 by the orderer in the layout information. After incorporating the orderer information in the layout information, the layout information generating apparatus 20 transmits the layout information to the image creating apparatus 30 through the network 900. The image creating apparatus 30 creates an image according to the layout information received from the layout information generating apparatus 20. For example, the image creating apparatus 30 creates an album 550 in which the orderer information is incorporated according to the layout information received from the layout information generating apparatus 20.

The image creating system 46 according to the present embodiment can print the orderer information filled in the sample by the orderer can be printed directly on an image created by the image creating apparatus 30. Thereby an image in which handwritings by the orderer are printed can be created, so that the orderer can be satisfied with the image such that the image by the image creating apparatus 30 is created only for the orderer.

Figure 15:
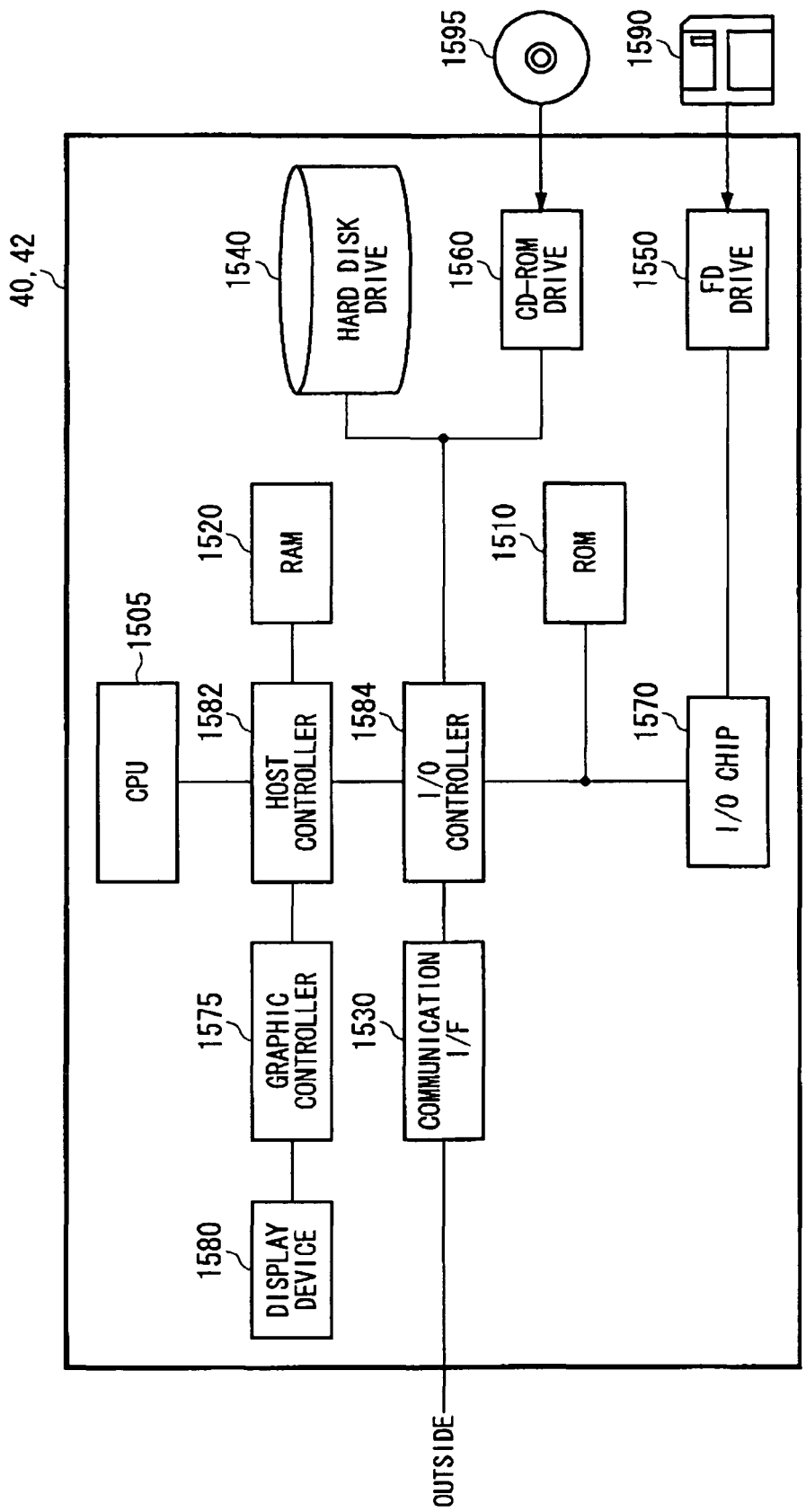
FIG. 15 is a block diagram showing a hardware configuration of the image creating system 40 and the image creating system 42.

FIG. 15 shows an example of the hardware configuration of the image creating system 40 and the image creating system 42 according to the present embodiment. The image creating system 40 and the image creating system 42 according to the present embodiment includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The communication interface 1530 communicates with the other units through the network. The hard disk drive 1540 stores the program and data used by the CPU 1505 in the image creating system 40 and the image creating system 42. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the image creating system 40 and the image creating system 42 at activating and a program depending on the hardware of the image creating system 40 and the image creating system 42. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The image creating program provided to the hard disk drive 1540 through the RAM 1520 is stored in a recording medium, such as the flexible disk 1590, the CD-ROM 1595, or an IC card and provided by the user. The image creating program is read from the recording medium, provided to the hard disk drive 1540 in the image creating system 40 and the image creating system 42 through the RAM 1520 and executed in the CPU 1505. The image creating program installed and executed in the image creating system 40 and the image creating system 42 operates the CPU 1505 to cause the image creating system 40 and the image creating system 42 described above with reference to FIG. 1-FIG. 14 to function as the image input section 100, the original image storage section 110, the low-capacity image storage section 112, the image data capacity conversion section 120, the image characteristic information acquiring section 125, the image identification information adding section 130, the image extracting section 140, the sample selecting section 150, the output device information acquiring section 160, the display section 170, the output section 172, the image output section 180, the image creating section 185, the orderer apparatus receiving section 190, the layout information receiving section 192, the orderer apparatus transmitting section 195, the image characteristic information transmitting section 197, the receiving control section 200, the transmission control section 205, the low-capacity image receiving section 210, the image characteristic information receiving section 212, the output characteristic information acquiring section 220, the output characteristic information storage section 225, the type of output device information acquiring section 230, the type of output information storage section 235, the image selecting section 240, the original image selecting section 242, the image cropping section 245, the template storage section 247, the layout information generating section 250, the layout information transmitting section 255, the type of output device transmitting section 260, the layout information transmitting section 262, the receiving section 300, the transmitting section 305, the original image acquiring section 310, the layout information acquiring section 320, the image creating section 330, the image output section 335 and the image storage section for image creation 340.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. A layout information generating apparatus for laying out an image provided by an orderer, comprising:
    a low-capacity image receiving section for receiving a low-capacity image obtained by reducing the capacity of an original image by the orderer;
    an output characteristic information acquiring section for automatically acquiring output characteristic information indicative of the output characteristic of an output device for outputting an image created by an image creating apparatus;
    an image selecting section for automatically selecting a low-capacity image to be laid out among the low-capacity images received by the low-capacity image receiving section based on the output characteristic information acquired by the output characteristic information acquiring section;
    a layout information generating section for generating layout information of the low-capacity image selected by the image selecting section; and
    a layout information transmitting section for transmitting the layout information generated by the layout information generating section to the output device and causing the output device to lay out the original image provided from the orderer and output the same according to the transmitted layout information, wherein
    the low-capacity image receiving section receives a low-capacity image and a color included in the original image corresponding to the low-capacity image,
    the output characteristic information acquiring section acquires output characteristic information indicative of a color which can be outputted by the output device,
    the image selecting section compares the color included in the original image received by the low-capacity image receiving section with the color indicated by the output characteristic information acquired by the output characteristic information acquiring section and preferentially selects the image more including the color which can be outputted by the output device as the low-capacity image to be laid out among the low-capacity images received by the low-capacity image receiving section further comprising an image cropping section for comparing the color included in the original color received by the low-capacity image receiving section with the color indicated by the output characteristic information acquired by the output characteristic information acquiring section and cropping a portion except for the other portion including a color which can not be reproduced by the output device as a low-capacity image to be laid out, wherein
    the layout information generating section generates layout information of the low-capacity image cropped from the low-capacity image by the image cropping section.

2. The layout information generating apparatus according to claim 1 further comprising:
    an output characteristic information storage section for storing output characteristic information of the output device in association with type of output device information indicative of the type of the output device; and
    a type of output device information acquiring section for acquiring the type of output device information of the output device which outputs the image created by the image creating apparatus from an orderer apparatus in association with the low-capacity image received by the low-capacity image receiving section, wherein
    the output characteristic information acquiring section acquires the output characteristic information stored in the output characteristic information storage section in association with the type of output device information acquired by the type of output device acquiring section.

3. The layout information generating apparatus according to claim 1, wherein
    the output characteristic information acquiring section receives output characteristic information indicative of the printing characteristic of a printing device for printing the image created by the image creating apparatus, and
    the layout information transmitting section transmits the layout information generated by the layout information generating section to the printing device and causing the printing device to print an image in which the original image provided from the orderer is laid out according to the transmitted layout information.

4. The layout information generating apparatus according to claim 3, wherein
    the output characteristic information acquiring section receives output characteristic information indicative of the remaining amount of ink for each color of the printing device for printing the image created by the image creating apparatus,
    the image selecting section selects a low-capacity image to be laid out among the low-capacity images received by the low-capacity image receiving section in order that the printing device can print by the remaining amount of ink for each color indicated by the output characteristic information acquired by the output characteristic information acquiring section, and
    the layout information generating section generates layout information of the low-capacity image selected by the image selecting section in order that the printing device can print by the remaining amount of ink for each color indicated by the output characteristic information acquired by the output characteristic information acquiring section.

5. The layout information generating apparatus according to claim 4, wherein
    the output characteristic information acquiring section receives output characteristic information indicative of the size of paper used for the printing device for printing the image created by the image creating apparatus, and the layout information generating section generates layout information of the low-capacity image selected by the image selecting section dependent on the size of paper indicated by the output characteristic information acquired by the output characteristic information acquiring section.

6. The layout information generating apparatus according to claim 4, wherein
the layout information generating section determines a color for the background of a template in which the low-capacity image selected by the image selecting section is laid out based on the output characteristic information acquired by the output characteristic information acquiring section.

7. The layout information generating apparatus according to claim 1, wherein
the output characteristic information acquiring section receives output characteristic information indicative of the output characteristic of a display device for displaying the image created by the image creating apparatus, and
the layout information transmitting section transmits the layout information generated by the layout information generating section to the display device and causes the display device to display an image in which the original image provided from the orderer is laid out according to the transmitted layout information.

8. The layout information generating apparatus according to claim 7, wherein
the output characteristic information acquiring section receives output characteristic information indicative of the display size of the display device for displaying the image created by the image creating apparatus,
the image selecting section selects a low-capacity image to be laid out among the low-capacity images received by the low-capacity image receiving section dependent on the display size indicated by the output characteristic information acquired by the output characteristic information acquiring section, and
the layout information generating section generates layout information of the law-capacity image selected by the image selecting section dependent on the display size indicated by the output characteristic information acquired by the output characteristic information acquiring section.

9. The layout information generating apparatus according to claim 1 further comprising:
a type of output device storage section for storing type of output device information indicative of the type of the output device in association with output characteristic information of the output device;
a type of output device information acquiring section for acquiring the type of output device information stored in the type of output device information storage section in association with the output characteristic information acquired by the output characteristic information acquiring section, and
a type of output device transmitting section for transmitting the type of the output device indicated by the type of output device information acquired by the type of output device information acquiring section to an orderer apparatus and causing the orderer apparatus to present the type of the output device to the orderer.

10. The layout information generating apparatus according to claim 9, wherein
the type of output device information storage section further stores output location information indicative of a location at which the output device is installed in association with the type of output device information, and
the type of output device transmitting section transmits to the orderer apparatus the location of the output device of which type is indicated by the type of output device information acquired by the type of output device information acquiring section and causes the orderer apparatus to present the transmitted location to the orderer.

11. The layout information generating apparatus according to claim 1, wherein
the output characteristic information acquiring section acquires output characteristic information indicative of the range of the printing region of the image on medium by the printing device for printing the image created by the image creating apparatus,
the image selecting section selects a low-capacity image to be laid out among the low-capacity images received by the low-capacity image receiving section dependent on the printing region indicated by the output characteristic information acquired by the output characteristic information acquiring section, and
the layout information generating section generates layout information of the low-capacity image selected by the image selecting section.

12. The layout information generating apparatus according to claim 11, wherein
the output characteristic information acquiring section acquires output characteristic information indicating whether a printing of the image on medium by the printing device is a frameless printing or a framed printing, and
the image selecting section selects a low-capacity image including the whole of a main subject therein and does not select a low-capacity image in which the main subject is cut by the circumference of the low-capacity image when the output characteristic information acquiring section acquires output characteristic information indicative of the framed printing.

13. A layout information generating method for generating layout information to lay out an image provided by an orderer, comprising:
receiving a low-capacity image obtained by reducing the capacity of an original image by the orderer;
automatically acquiring output characteristic information indicative of the output characteristic of an output device for outputting an image created by an image creating apparatus;
automatically selecting a low-capacity image to be laid out among the low-capacity images received in the low-capacity image receiving step based on the output characteristic information acquired in the output characteristic information acquiring step;
generating layout information of the low-capacity image selected in the image selecting step; and
transmitting the layout information generated in the layout information generating step to an output device and for causing the output device to lay out an original image provided from the orderer and output the same according to the transmitted layout information;
wherein the low-capacity image receiving step receives a low-capacity image and a color included in the original image corresponding to the low-capacity image,
the output characteristic information acquiring step acquires output characteristic information indicative of a color which can be outputted by the output device,
the image selecting step compares the color included in the original image received by the low-capacity image receiving section with the color indicated by the output characteristic information acquired by the output characteristic information acquiring section and preferentially selects the image more including the color which can be outputted by the output device as the low-capacity image to be laid out among the low-capacity images received by the low-capacity image receiving section further comprising an image cropping step including comparing the color included in the original color received by the low-capacity image receiving step with the color indicated by the output characteristic information acquired by the output characteristic information acquiring step and cropping a portion except for the other portion including a color which can not be reproduced by the output device as a low-capacity image to be laid out, wherein the layout information generating step generates layout information of the low-capacity image cropped from the low-capacity image by the image cropping step.

14. A non-transitory computer-readable medium embodied with a layout information creating program for a layout information creating apparatus for laying out an image provided from an orderer, the layout information creating program operates the layout information generating apparatus to function as:

a low-capacity image receiving section for receiving a low-capacity image obtained by reducing the capacity of an original image by the orderer;

an output characteristic information acquiring section for automatically acquiring output characteristic information indicative of the output characteristic of an output device for outputting an image created by an image creating apparatus;

an image selecting section for automatically selecting a low-capacity image to be laid out among the low-capacity images received by the low-capacity image receiving section based on the output characteristic information acquired by the output characteristic information acquiring section;

a layout information generating section for generating layout information of the low-capacity image selected by the image selecting section; and a layout information transmitting section for transmitting the layout information generated by the layout information generating section to an output device and causing the output device to lay out the original image provided from the orderer and output the same according to the transmitted layout information;

wherein the low-capacity image receiving section receives a low-capacity image and a color included in the original image corresponding to the low-capacity image, the output characteristic information acquiring section acquires output characteristic information indicative of a color which can be outputted by the output device, the image selecting section compares the color included in the original image received by the low-capacity image receiving section with the color indicated by the output characteristic information acquired by the output characteristic information acquiring section and preferentially selects the image more including the color which can be outputted by the output device as the low-capacity image to be laid out among the low-capacity images received by the low-capacity image receiving section further comprising an image cropping section for comparing the color included in the original color received by the low-capacity image receiving section with the color indicated by the output characteristic information acquired by the output characteristic information acquiring section and cropping a portion except for the other portion including a color which can not be reproduced by the output device as a low-capacity image to be laid out, wherein the layout information generating section generates layout information of the low-capacity image cropped from the low-capacity image by the image cropping section.

15. A layout information generating apparatus for laying out an image provided from an orderer, comprising:

a) an image characteristic information receiving section for automatically receiving image characteristic information indicative of the characteristic of an original image in association with an original image identifier to identify the original image, the image characteristic information extracted by automatically analyzing the original image;

b) an original image selecting section for automatically selecting the original image to be laid out based on the image characteristic information received in association with the original image identifier by the image characteristic information receiving section;

c) a layout information generating section for generating layout information by associating the original image identifier to identify the original image selected by the original image selecting section with a layout frame; and d) a layout information transmitting section for transmitting the layout information generated by the layout information generating section to an orderer apparatus and for causing the orderer apparatus to create an image in which the original image identified by the original image identifier is laid out according to the transmitted layout information, wherein the image characteristic information is associated with the layout frame in the template, in advance of each of the operations of sections a) through d) on at least one of the original image and the original image identifier.

16. A layout information generating apparatus for laying out an image provided from an orderer, according to claim 15, comprising:

the image characteristic information includes at least one of information indicative of a position of the main subject on the original image, information indicative of the size of the main subject on the original image and information indicative of the time and date at which the original image is captured.

17. An orderer apparatus for creating an image, comprising:

a) an image characteristic information acquiring section for automatically acquiring image characteristic information indicative of the characteristic of an original image in association with an original image identifier for identifying the original image, the image characteristic information extracted by automatically analyzing the original image;

b) an image characteristic information transmitting section for transmitting the image characteristic information acquired by the image characteristic information acquiring section to a layout information generating apparatus in association with the original image identifier;

c) a layout information receiving section for receiving layout information generated by associating the original image identifier with a layout frame by the layout information generating apparatus based on the image characteristic information transmitted by the image characteristic information transmitting section; and d) an image creating section for creating an image in which the original image identified by the original image identifier according to the layout information received by the layout information receiving section, wherein the image characteristic information is associated with the layout frame in the template, in advance of each of the operations of sections a) through d) on at least one of the original image and the original image identifier.

18. An orderer apparatus for creating an image, according to claim 17, comprising:

the image characteristic information includes at least one of information indicative of a position of the main subject on the original image, information indicative of the size of the main subject on the original image and information indicative of the time and date at which the original image is captured.

19. An orderer apparatus for creating an image according to claim 17, wherein the image characteristic information includes at least one of information indicative of a relationship between a main subject of the original image and the original image, information identifying a subject of the original image, information indicative of an outward state of the subject of the original image, information indicative of a structure line of the original image, information indicative of a capturing condition of the original image and information indicative of a theme of the original image.

20. An image creating system comprising:

a) an orderer apparatus for creating an image; and
b) a layout information generating apparatus for laying out an image provided from an orderer, wherein
the orderer apparatus including:
c) an image characteristic information acquiring section for automatically acquiring image characteristic information indicative of the characteristic of an original image in association with an original image identifier for identifying the original image, the image characteristic information extracted by automatically analyzing the original image;
d) an image characteristic information transmitting section for transmitting the image characteristic information acquired by the image characteristic information acquiring section to a layout information generating apparatus in association with the original image identifier;
e) a layout information receiving section for receiving layout information generated by associating the original image identifier with a layout frame by the layout information generating apparatus based on the image characteristic information transmitted by the image characteristic information transmitting section; and
f) an image creating section for creating an image in which the original image identified by the original image identifier is laid out according to the layout information received by the layout information receiving section, and wherein
the layout information generating apparatus including:
g) an image characteristic information receiving section for receiving image characteristic information transmitted from the image characteristic information transmitting section in association with an original image identifier;
h) an original image selecting section for automatically selecting the original image to be laid out in an image based on the image characteristic information received by the image characteristic information receiving section in association with the original image identifier;
i) a layout information generating section for generating layout information by associating the original image identifier to identify the original image selected by the original image selecting section with a layout frame; and
j) a layout information transmitting section for transmitting the layout information generated by the layout information generating section to the layout information receiving section and for causing the image creating section to create an image in which the original image identified by the original image identifier is laid out according to the transmitted layout information, wherein the image characteristic information is associated with the layout frame in the template, in advance of each of the operations of sections a) through j).

21. An image creating system according to claim 20 comprising:

the image characteristic information includes at least one of information indicative of a position of the main subject on the original image, information indicative of the size of the main subject on the original image and information indicative of the time and date at which the original image is captured.

22. An image creating method including:

a) automatically acquiring image characteristic information indicative of the characteristic of an original image in association with an original image identifier to identify the original image, the image characteristic information extracted by automatically analyzing the original image;
b) transmitting the image characteristic information acquired in the image characteristic information acquiring step to a layout information generating apparatus in association with the original image identifier;
c) receiving the image characteristic information transmitted in the image characteristic information transmitting step in association with the original image identifier;
d) automatically selecting an original image to be laid out in the image based on the image characteristic information received in association with the original image identifier in the image characteristic information receiving step;
e) generating layout information by associating the original image identifier to identify the original image selected in the original image selecting step with a layout frame;
f) transmitting the layout information generated in the layout information generating step to an orderer apparatus;
g) receiving the layout information transmitted in the layout information transmitting step; and
h) creating an image in which the original image identified by the original image identifier is laid out according to the layout information received in the layout information receiving step, wherein the image characteristic information is associated with the layout frame in the template, in advance of each of steps a) through h) on at least one of the original image and the original image identifier.

23. An image creating method according to claim 22 including:

the image characteristic information includes at least one of information indicative of a position of the main subject on the original image, information indicative of the size of the main subject on the original image and information indicative of the time and date at which the original image is captured.

24. A non-transitory computer-readable medium embodied with an image creating program for an image creating system comprising an orderer apparatus for creating an image and a layout information generating apparatus for laying out an image provided by an orderer, the image creating program operates the image creating system to function as:

a) an image characteristic information acquiring section for automatically acquiring image characteristic information indicative of the characteristic of an original image in association with an original image identifier for identifying the original image, the image characteristic information extracted by automatically analyzing the original image;

b) an image characteristic information transmitting section for transmitting the image characteristic information acquired by the image characteristic information acquiring section to a layout information generating apparatus in association with the original image identifier;

c) a layout information receiving section for receiving layout information generated by associating the original image identifier with a layout frame by the layout information generating apparatus based on the image characteristic information transmitted by the image characteristic information transmitting section; and d) an image creating section for creating an image in which the original image identified by the original image identifier is laid out according to the layout information received by the layout information receiving section, and e) an image characteristic information receiving section for receiving image characteristic information transmitted from the image characteristic information transmitting section in association with an original image identifier;

f) an original image selecting section for automatically selecting the original image to be laid out in an image based on the image characteristic information received by the image characteristic information receiving section in association with the original image identifier;

g) a layout information generating section for generating layout information by associating the original image identifier to identify the original image selected by the original image selecting section with a layout frame; and h) a layout information transmitting section for transmitting the layout information generated by the layout information generating section to the layout information receiving section and for causing the image creating section to create an image in which the original image identified by the original image identifier is laid out according to the transmitted layout information, wherein the image characteristic information is associated with the layout frame in the template, in advance of each of the operations of sections a) through h) on at least one of the original image and the original image identifier.

25. An image creating program for an image creating system according to claim 24 comprising:

the image characteristic information includes at least one of information indicative of a position of the main subject on the original image, information indicative of the size of the main subject on the original image and information indicative of the time and date at which the original image is captured.

* * * * *